US012784156B2

(12) United States Patent
Lu et al.

(10) Patent No.: US 12,784,156 B2
(45) Date of Patent: Nov. 3, 2026

(54) HIGH PERFORMANCE AND LOW COMPLEXITY ADAPTIVE VIDEO IMAGE DEFOGGING

(71) Applicant: Ambarella International LP, Santa Clara, CA (US)

(72) Inventors: Yao Lu, Shanghai (CN); Lu Wang, Shanghai (CN); Xin-Yue Zhang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 132 days.

(21) Appl. No.: 18/965,113

(22) Filed: Dec. 2, 2024

(65) Prior Publication Data

US 2026/0148350 A1 May 28, 2026

(30) Foreign Application Priority Data

Nov. 28, 2024 (CN) ........................ 202411723151.X

(51) Int. Cl.
*G06T 5/70* (2024.01)
*G06T 5/20* (2006.01)
(Continued)

(52) U.S. Cl.
CPC .................. *G06T 5/70* (2024.01); *G06T 5/20* (2013.01); *G06T 5/73* (2024.01); *G06T 5/94* (2024.01);
(Continued)

(58) Field of Classification Search
CPC .... G06T 5/70; G06T 5/20; G06T 5/73; G06T 5/94; G06T 11/23; G06T 2207/10016;
(Continued)

(56) References Cited

U.S. PATENT DOCUMENTS

2011/0007188 A1* 1/2011 Manabe .................... G06T 5/20 348/240.2
2014/0205192 A1* 7/2014 Wang ........................ G06T 5/73 382/167
(Continued)

FOREIGN PATENT DOCUMENTS

CN 110163804 A * 8/2019 ............... G06T 5/73

*Primary Examiner* — Xiao M Wu
*Assistant Examiner* — George Renze
(74) *Attorney, Agent, or Firm* — Maiorana Patent Law, PA

(57) ABSTRACT

An apparatus comprising an interface and a processor. The interface may be configured to receive pixel data of an environment. The processor may be configured to process the pixel data arranged as video frames, generate a luminance distribution map of the video frames in response to a low-pass filter operation, determine a plurality of defogging intensity weights for the luminance distribution map, perform adaptive smoothing to each of the plurality of defogging intensity weights, and generate defogged video frames in response to the video frames and the plurality of defogging intensity weights with the adaptive smoothing. The plurality of defogging intensity weights may each correspond to one of a plurality of luminance intervals of the luminance distribution map. The adaptive smoothing may be configured to prevent brightness differences in the defogged video frames.

20 Claims, 14 Drawing Sheets

(51) Int. Cl.

| | |
|---|---|
| ***G06T 5/73*** | (2024.01) |
| ***G06T 5/94*** | (2024.01) |
| ***G06T 11/23*** | (2026.01) |

(52) U.S. Cl.
CPC .... *G06T 11/23* (2026.01); *G06T 2207/10016* (2013.01); *G06T 2207/20012* (2013.01); *G06T 2207/30252* (2013.01); *G06T 2210/36* (2013.01)

(58) Field of Classification Search
CPC . G06T 2207/20012; G06T 2207/30252; G06T 2210/36
See application file for complete search history.

(56) References Cited

U.S. PATENT DOCUMENTS

| | | | | |
|---|---|---|---|---|
| 2018/0108327 | A1* | 4/2018 | Jung | G06T 5/40 |
| 2019/0114747 | A1* | 4/2019 | Treibitz | G06F 16/9027 |
| 2024/0078648 | A1* | 3/2024 | Kornienko | G06T 5/20 |

* cited by examiner

HIGH PERFORMANCE AND LOW COMPLEXITY ADAPTIVE VIDEO IMAGE DEFOGGING

This application relates to China Application No. 202411723151.X, filed on Nov. 28, 2024, which is incorporated by reference.

FIELD OF THE INVENTION

The invention relates to video processing generally and, more particularly, to a method and/or apparatus for implementing high performance and low complexity adaptive video image defogging.

BACKGROUND

Video image processing is a rapidly developing field. Various types of video and image processing are capable of increasing video quality, clarifying details, enhancing low resolution video, etc. With the continuous development of video image processing technology, there are gradually higher expectations for video image quality in special environments. Particularly in vehicle applications, video image processing can provide enhanced driver assistance features. The image quality of a dashcam footage, vehicle surround view cameras, and vehicle rearview mirror are related to driving safety. However, in extreme weather, such as foggy weather, there will be an impact on image quality. Fog and other distortions result in a large blur in the video images, resulting in image details that are not able to be clearly seen. Unclear images affect an ability of the driver to observe the road conditions. Foggy conditions can be one of the most dangerous driving conditions. Video image defogging control has practical significance.

Defogging video images is a difficult issue. Fog is generally non-uniform. Conventional defogging techniques can result in uneven brightness in the output video. Conventional defogging techniques are unable to adapt to changing fog conditions. Conventional defogging techniques are complicated and computationally expensive, which can make real-time applications difficult to achieve.

It would be desirable to implement high performance and low complexity adaptive video image defogging.

SUMMARY

The invention concerns an apparatus comprising an interface and a processor. The interface may be configured to receive pixel data of an environment. The processor may be configured to process the pixel data arranged as video frames, generate a luminance distribution map of the video frames in response to a low-pass filter operation, determine a plurality of defogging intensity weights for the luminance distribution map, perform adaptive smoothing to each of the plurality of defogging intensity weights, and generate defogged video frames in response to the video frames and the plurality of defogging intensity weights with the adaptive smoothing. The plurality of defogging intensity weights may each correspond to one of a plurality of luminance intervals of the luminance distribution map. The adaptive smoothing may be configured to prevent brightness differences in the defogged video frames.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
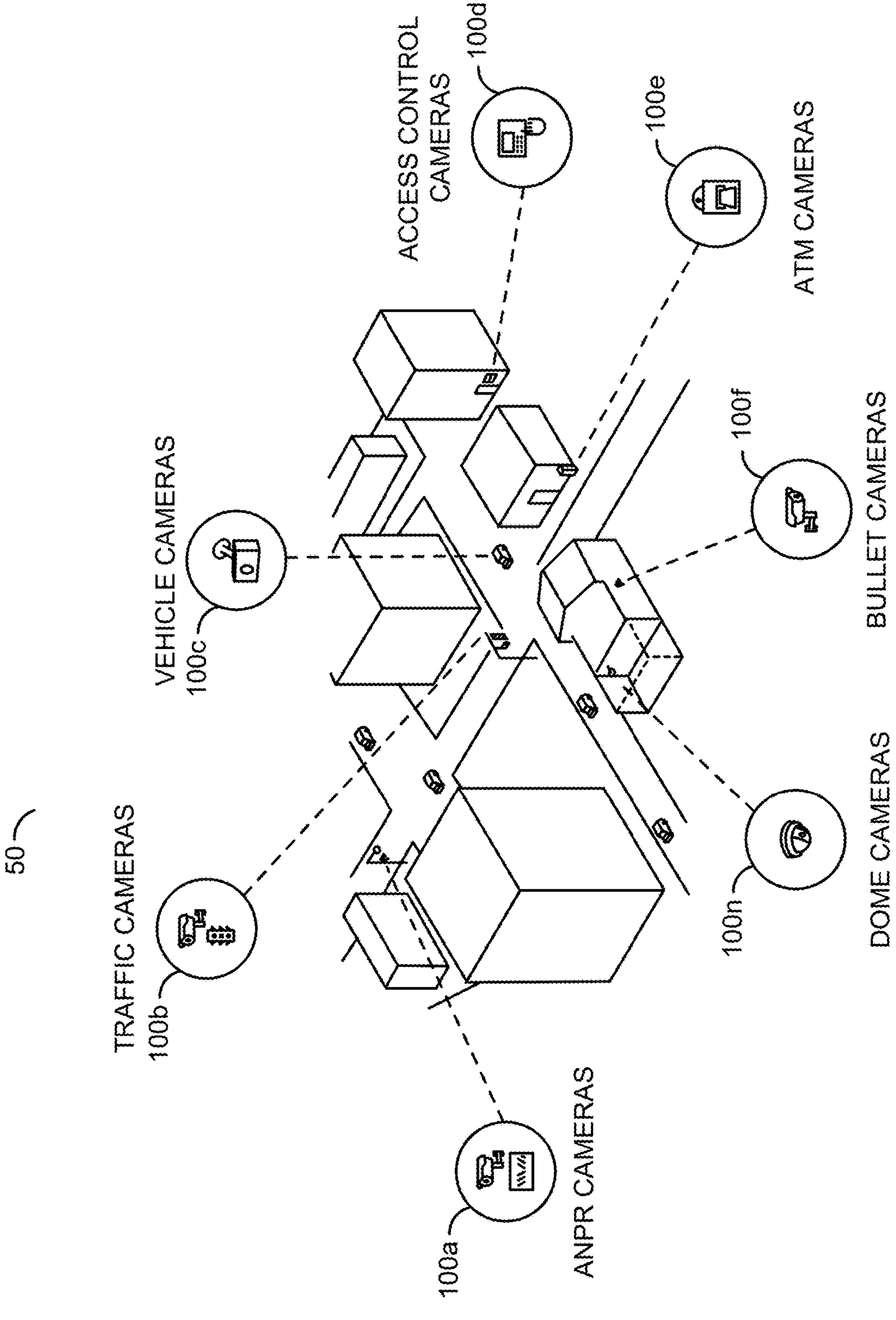
FIG. 1 is a diagram illustrating examples of cameras that may implement a high performance and low complexity adaptive video image defogging in accordance with example embodiments of the invention.

Embodiments of the present invention include providing high performance and low complexity adaptive video image defogging that may (i) adapt to non-uniformity of fog in an image, (ii) provide adaptive control of defogging intensity in a real-time environment, (iii) generate high quality output images, (iv) be implemented with low complexity to provide defogging in real-time, (v) adjust an amount of regional defogging of an image based on a luminance distribution map, (vi) prevent defogging from causing large brightness changes, (vii) remove blur caused by fog, (viii) provide a smooth transition for defogging based on a Bezier curve, and/or (ix) be implemented as one or more integrated circuits.

Embodiments of the present invention may be configured to perform defogging operations on input video frames. The defogging operations may be configured to generate defogged video frames. The defogged video frames may be generated in real-time to reduce an amount of fog present in the video frames. The reduction of the fog may be adaptively controlled. For example, the amount of fog reduction may be determined regionally in each video frame based on a location in the video frame and a luminance distribution of the video frame. The adaptive control of the defogging may be configured to respond to a non-uniform characteristic of fog and/or changing fog conditions in a real-time environment. For example, the defogging operations may control a defogging intensity according to the fog changes in the real-time environment in order to generate high-quality defogged output images.

The defogging operations may be configured to provide adaptive video image defogging with high performance and low complexity. The high performance may enable the defogging operations to be performed in real-time. The low complexity may enable the defogging operations to be performed without being computationally expensive. The low complexity may enable cameras to implement defogging operations in hardware that may be inexpensive and/or limit power consumption and heat generation. For example, a vehicle may implement multiple cameras to provide an all-around view. The low complexity may enable multiple cameras on a vehicle to each implement the defogging operations. With high performance and low complexity, the usage of hardware resources may be limited while performing the defogging operations with adaptive smooth control.

The defogging operations may comprise processing input image data, extracting a luminance distribution at different locations of the image through filtering, and/or performing divisional defogging control on the luminance distribution obtained at the different locations. The different intensity of defogging may be independently set in different luminance regions to effectively remove image blur caused by fog. The divisional defogging control may be based on a curve fitting. In one example, the curve fitting may be a Bezier curve. The curve fitting may enable a smooth transition of defogging in the different luminance regions and adaptive control to generate the high quality video images with high definition.

The defogging operations may be configured to divide input image data into a high-frequency detail layer and a low-frequency luminance layer. A low-pass filter operation may be performed on the input image data to generate a low-frequency layer. Based on the image position distribution of luminance in the low-frequency layer, a luminance distribution map may be determined. The luminance distribution map may accurately represent luminance distribution of the input image data. The luminance distribution map may be based on multiple rectangular regions of the low-frequency layer. For example, output statistics corresponding to particular rectangular regions may make up the luminance distribution map.

Based on the luminance distribution map, the luminance distribution may be divided into multiple luminance intervals (e.g., N total count of intervals). The N luminance intervals may be sorted from darkest to brightest. A control point for defogging intensity may be set for each luminance interval. For example, an input argument value providing the control point may be used as a weight of defogging strength.

In response to the selection of the control weights of the N defogging strength control points, the defogging operations may determine adaptive smoothing control. The adaptive smoothing control may implement a fitting control. For example, the fitting control implemented may be a Bezier curve. The Bezier curve may be a type of smoothing often used in drawing software. The smoothing performance of the Bezier curve may be set to the strength weights of the defogging control points. The fitting control may be implemented to ensure the smoothness of the image luminance distribution after defogging. Ensuring the smoothness of the luminance distribution may avoid large jumps in image brightness differences (e.g., prevent local and/or adjacent regions in the output video frames from having high contrast differences). Generally, the higher order of Bezier curve implemented, the smoother the fitting curve. However, the higher order Bezier curve may increase the complexity of the implementation of the defogging operations (e.g., use more hardware resources than a lower order Bezier curve). Embodiments of the present invention may balance the desired smoothness of the output with the demands on hardware resources.

The entire image luminance distribution may be defogged according to the N smooth defogging strength control weights. In the corresponding image luminance intervals, the control weights may be fitted based on the luminance distribution map. Fitting the control weights may be implemented in real time to obtain the self-adaptive video image defogging control based on the image position and luminance distribution.

Referring to FIG. 1, a diagram illustrating examples of cameras that may implement a high performance and low complexity adaptive video image defogging in accordance with example embodiments of the invention is shown. An overhead view of an area 50 is shown. In the example shown, the area 50 may be an outdoor location. Streets, vehicles and buildings are shown.

Devices 100*a*-100*n* are shown at various locations in the area 50. The devices 100*a*-100*n* may each implement an edge device. The edge devices 100*a*-100*n* may comprise smart IP cameras (e.g., camera systems). The edge devices 100*a*-100*n* may comprise low power technology designed to be deployed in embedded platforms at the edge of a network (e.g., microprocessors running on sensors, cameras, or other battery-powered devices), where power consumption is a critical concern. In an example, the edge devices 100*a*-100*n* may comprise various traffic cameras and intelligent transportation systems (ITS) solutions.

The edge devices 100*a*-100*n* may be implemented for various applications. In the example shown, the edge devices 100*a*-100*n* may comprise automated number plate recognition (ANPR) cameras 100*a*, traffic cameras 100*b*, vehicle cameras 100*c*, access control cameras 100*d*, automatic teller machine (ATM) cameras 100*e*, bullet cameras 100*f*, dome cameras 100*n*, etc. In an example, the edge devices 100*a*-100*n* may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100*a*-100*n* may be implemented at various indoor locations. In an example, edge devices 100*a*-100*n* may incorporate a convolutional neural network in order to be utilized in security (surveillance) applications and/or access control applications. In an example, the edge devices 100*a*-100*n* implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100*a*-100*n* may be varied according to the design criteria of a particular implementation.

The camera systems 100*a*-100*n* may capture video in foggy environments in the outdoor location area 50. For example, as the weather changes in the outdoor location area 50, there may be different amounts of visibility. The visibility in the outdoor location area 50 may change in real-time. Even cameras in indoor locations may capture foggy conditions (e.g., a humid ice hockey rink may appear foggy). Each of the camera systems 100*a*-100*n* may be configured to implement the high performance and low complexity adaptive video image defogging.

Figure 2:
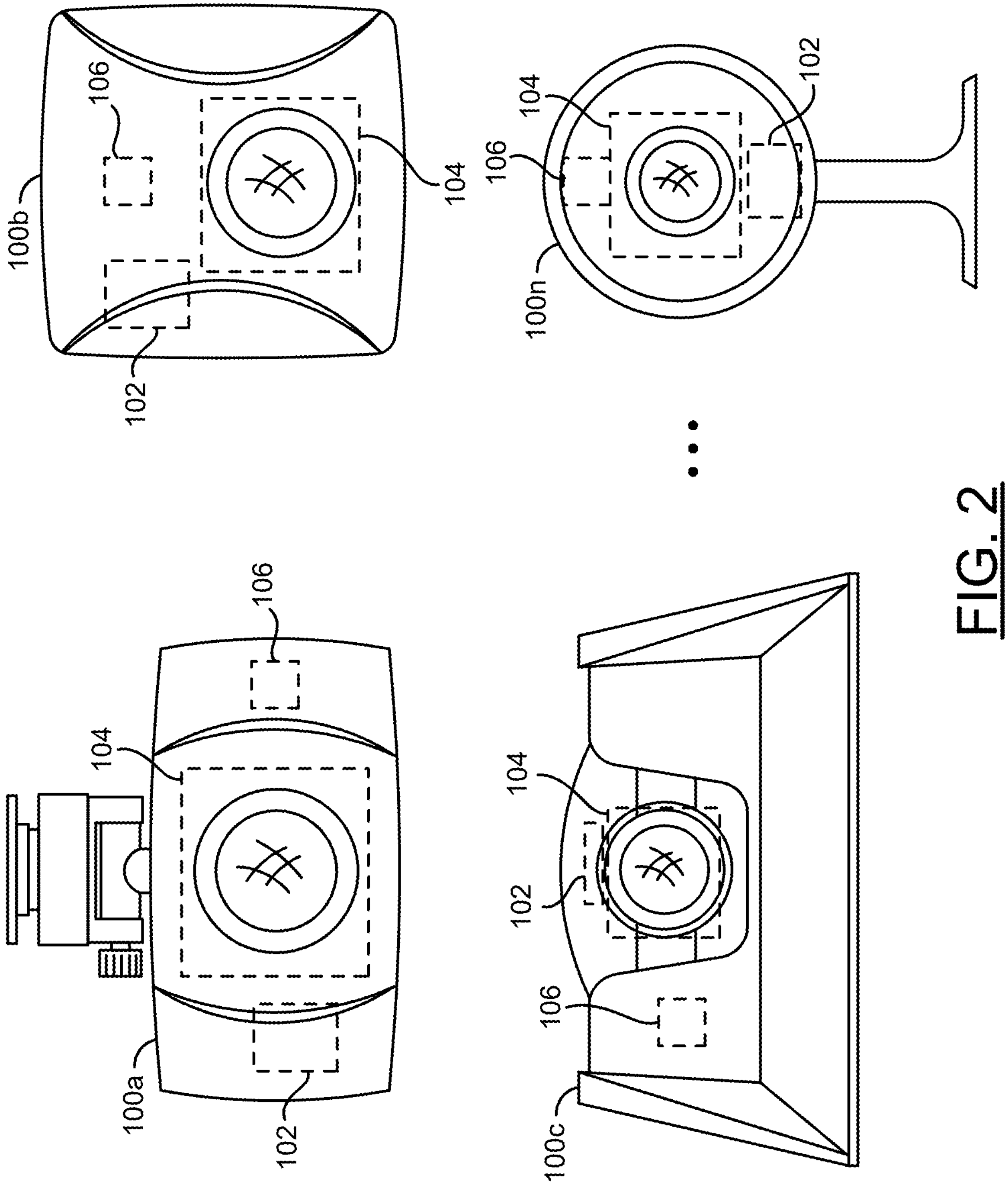
FIG. 2 is a diagram illustrating example edge device cameras.

Referring to FIG. 2, a diagram illustrating example edge device cameras is shown. The camera systems 100*a*-100*n* are shown. Each camera device 100*a*-100*n* may have a different style and/or use case. For example, the camera 100*a* may be an action camera, the camera 100*b* may be a ceiling mounted security camera, the camera 100*n* may be a webcam, etc. Other types of cameras may be implemented (e.g., home security cameras, battery powered cameras, doorbell cameras, stereo cameras, etc.). In some embodiments, the camera systems 100*a*-100*n* may be stationary cameras (e.g., installed and/or mounted at a single location). In some embodiments, the camera systems 100*a*-100*n* may be handheld cameras. In some embodiments, the camera systems 100*a*-100*n* may be configured to pan across an area, may be attached to a mount, a gimbal, a camera rig, etc. The design/style of the cameras 100*a*-100*n* may be varied according to the design criteria of a particular implementation.

Each of the camera systems 100*a*-100*n* may comprise a block (or circuit) 102, a block (or circuit) 104 and/or a block (or circuit) 106. The circuit 102 may implement a processor. The circuit 104 may implement a capture device. The circuit 106 may implement an inertial measurement unit (IMU). The camera systems 100*a*-100*n* may comprise other components (not shown). Details of the components of the cameras 100*a*-100*n* may be described in association with FIG. 4.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100*a*-100*n* are shown without implementing a structured light projector, some of the cameras 100*a*-100*n* may be implemented with a structured light projector (e.g., cameras that implement a sensor that capture IR light).

The cameras 100*a*-100*n* may be edge devices. The processor 102 implemented by each of the cameras 100*a*-100*n* may enable the cameras 100*a*-100*n* to implement various functionality internally (e.g., at a local level). For example, the processor 102 may be configured to perform object/event detection (e.g., computer vision operations), 3D reconstruction, liveness detection, depth map generation, video encoding, electronic image stabilization and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100*a*-100*n* may operate independently from each other). For example, each of the cameras 100*a*-100*n* may individually analyze the pixel data captured and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
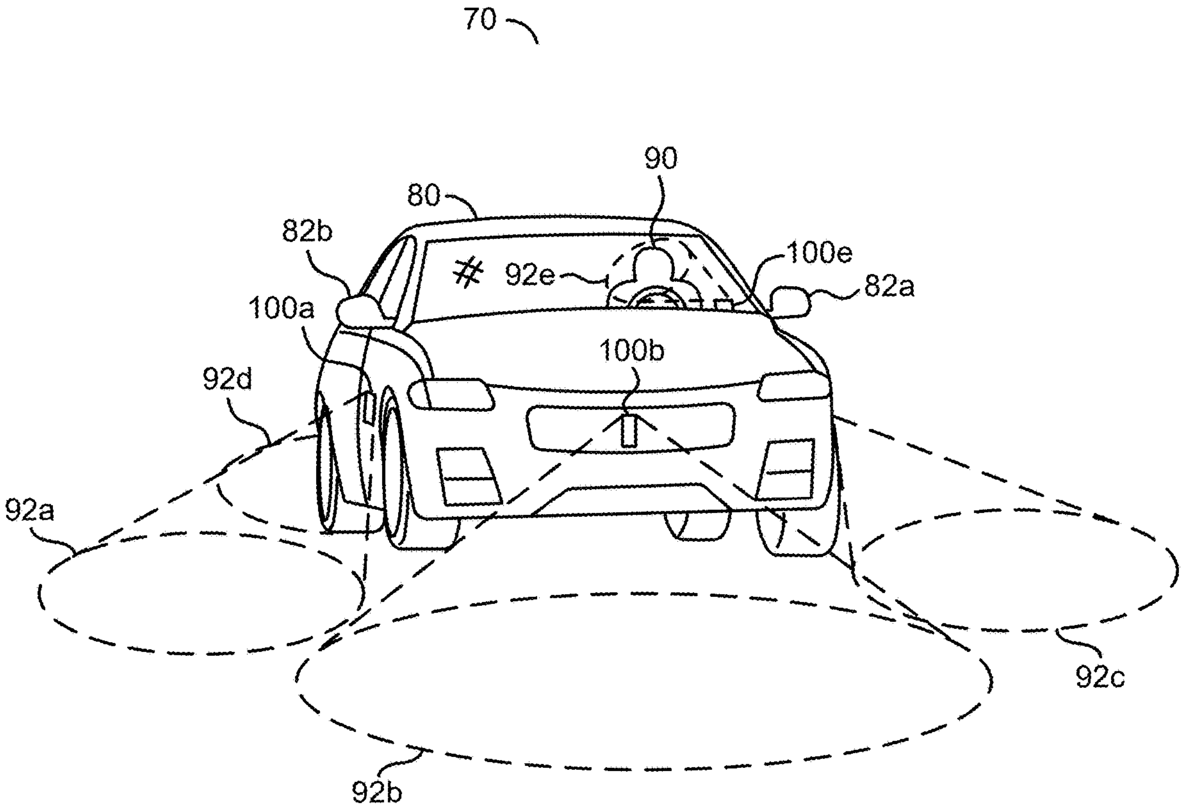
FIG. 3 is a diagram illustrating an example embodiment of the present invention configured to provide an all-around view of a vehicle.

Referring to FIG. 3, a diagram illustrating an example embodiment of the present invention configured to provide an all-around view of a vehicle is shown. An external environment 70 with a vehicle 80 is shown. In the example shown, the vehicle 80 may be a personal vehicle. In one example, the vehicle 80 may be a commercial vehicle (e.g., package delivery, a service van, a public transport van, etc.). In some embodiments, the vehicle 80 may be a commercial truck (e.g., a semi-trailer truck). In some embodiments, the vehicle 80 may be a pickup truck (e.g., a light duty vehicle, a medium duty vehicle, a heavy duty vehicle, etc.). In some embodiments, the vehicle 80 may be a commuter and/or home use vehicle (e.g., a family vehicle such as a sedan, a minivan, a SUV, a crossover, etc.). The vehicle 80 may be an internal combustion engine (ICE) vehicle, a diesel vehicle, a hybrid electric vehicle, a battery electric vehicle, etc. The type of the vehicle 80 implemented may be varied according to the design criteria of a particular implementation.

External side view mirrors 82*a*-82*b* are shown on the vehicle 80. The side view mirror 82*a* may be a side view mirror on the driver side of the vehicle 80. The side view mirror 82*b* may be a side view mirror on the passenger side of the vehicle 80. A driver 90 is shown in the interior of the vehicle 80. The vehicle 80 may comprise devices 100*a*-100*n*. The devices 100*a*-100*n* may be camera systems. Camera systems 100*a*-100*b* are shown integrated as part of the vehicle 80. The camera system 100*a* is shown on a passenger side of the vehicle 80. The camera system 100*a* is shown below the passenger side view mirror 82*b*. The camera system 100*b* is shown on the front grille of the vehicle 80. In the perspective of the vehicle 80 shown, three of the camera systems 100*a*-100*b* and 100*e* may be visible. However, one of the camera systems 100*a*-100*n* may be implemented at a level below the driver side view mirror 82*a* (not visible from the perspective of the external view shown). Other camera systems 100*a*-100*n* may be located throughout the exterior and/or interior of the vehicle 80. The camera systems 100*a*-100*n* may be configured to capture an all-around view of the environment 70 near the vehicle 80.

Dashed lines 92*a*-92*e* are shown. In the example shown, the dashed lines 92*a* are shown extending from the camera system 100*a* and the dashed lines 92*b* are shown extending from the camera system 100*b* towards the exterior of the vehicle. The dashed lines 92*c*-92*d* may similarly extend from respective camera systems 100*c*-100*d* (not visible from the perspective shown). The dashed lines 92*a*-92*d* may provide an illustrative representation of fields of view captured by each of the camera systems 100*a*-100*d*. The fields of view 92*a*-92*d* together may provide an all-around view of the environment near the vehicle 80.

The all-around view 92*a*-92*d* is shown. In an example, the all-around view 92*a*-92*d* may enable an all-around view (AVM) system. The AVM system may comprise four cameras (e.g., each camera may comprise a combination of one of the camera systems 100*a*-100*n* and/or a stereo pair of the lenses implemented by the camera systems 100*a*-100*n*). In the perspective shown in the environment 70, the camera system 100*a* and the camera system 100*b* may each be one of the four cameras and the other two cameras may not be visible. In an example, the camera system 100*b* may be a camera located on the front grille of the vehicle 80, one of the cameras may be on the rear (e.g., over the license plate), the camera system 100*a* may be located below the side view mirror 82*b* on the passenger side and one of the cameras may be located below the side view mirror 82*a* on the driver side. The arrangement of the cameras may be varied according to the design criteria of a particular implementation.

The dashed lines 92*e* are shown are shown extending from the camera system 100*e* towards an interior of the vehicle 80. The camera system 100*e* may be a cabin monitoring camera system. The camera system 100*e* may be configured to capture the field of view 92*e* of the cabin of the vehicle 80. The field of view 92*e* may be directed towards the driver 90. In some embodiments, the field of view 92*e* may be directed towards the driver 90 and/or other occupants of the vehicle 80.

In some embodiments, each of the camera systems 100*a*-100*e* may be configured to capture pixel data arranged as video frames. In some embodiments, each of the camera systems 100*a*-100*d* providing the all-around view 92*a*-92*d* and/or the camera system 100*e* providing the cabin view may implement a fisheye lens (e.g., may capture a video frame with a 180 degree angular aperture). The all-around view 92*a*-92*d* is shown providing a field of view coverage all around the vehicle 80. For example, the portion of the all-around view 92*a* may provide coverage for a passenger side of the vehicle 80, the portion of the all-around view 92*b* may provide coverage for a front of the vehicle 80, the portion of the all-around view 92*c* may provide coverage for a driver side of the vehicle 80 and the portion of the all-around view 92*d* may provide coverage for a rear of the vehicle 80. Each portion of the all-around view 92*a*-92*d* may be one field of view of a camera mounted to the vehicle 80. Each portion of the all-around view 92*a*-92*d* may be dewarped and stitched together by the video processors to provide an enhanced video frame that represents a top-down view near the vehicle 80. The camera systems 100*a*-100*d* may be configured to implement a Bird's Eye View Transformer network (e.g., a deep learning model designed to generate BEV representations from multi-camera images). In an example, the all-around view 92*a*-92*d* may be used to provide a representation of a bird's-eye view of the vehicle 80.

The camera systems 100*a*-100*e* may provide a representative example of the mechanism for image acquisition. In one example, the camera systems 100*a*-100*e* may be implemented as monocular cameras. In another example, the camera systems 100*a*-100*e* may be implemented as stereo cameras (e.g., two capture devices implemented in a stereo pair). In some embodiments, the stereo cameras may be horizontally oriented. In some embodiments, the stereo cameras may be vertically oriented. In one example, four stereo cameras (e.g., eight capture devices) may be implemented, with one on each side of the vehicle 80. In some embodiments, the camera systems 100*a*-100*n* may be installed as an aftermarket product. For example, the vehicle 80 may be sold without a camera and one or more of the camera systems 100*a*-100*n* may be installed on the vehicle 80. The implementation and/or locations of the camera systems 100*a*-100*e* on the vehicle 80 and/or the orientation of the camera systems 100*a*-100*e* may be varied according to the design criteria of a particular implementation.

The camera systems 100*a*-100*d* may capture foggy conditions of the external environment 70. For example, the vehicle 80 may travel through changing weather conditions that may have different amounts of visibility. Each of the camera systems 100*a*-100*e* may be configured to implement the high performance and low complexity adaptive video image defogging. For the cameras located on the exterior of the vehicle 80 (e.g., the camera systems 100*a*-100*d*), the fog may affect the visibility of the driver 90. The fog may affect the quality of the images that the exterior camera systems 100*a*-100*d* captures for use by various driver assistance systems.

Figure 4:
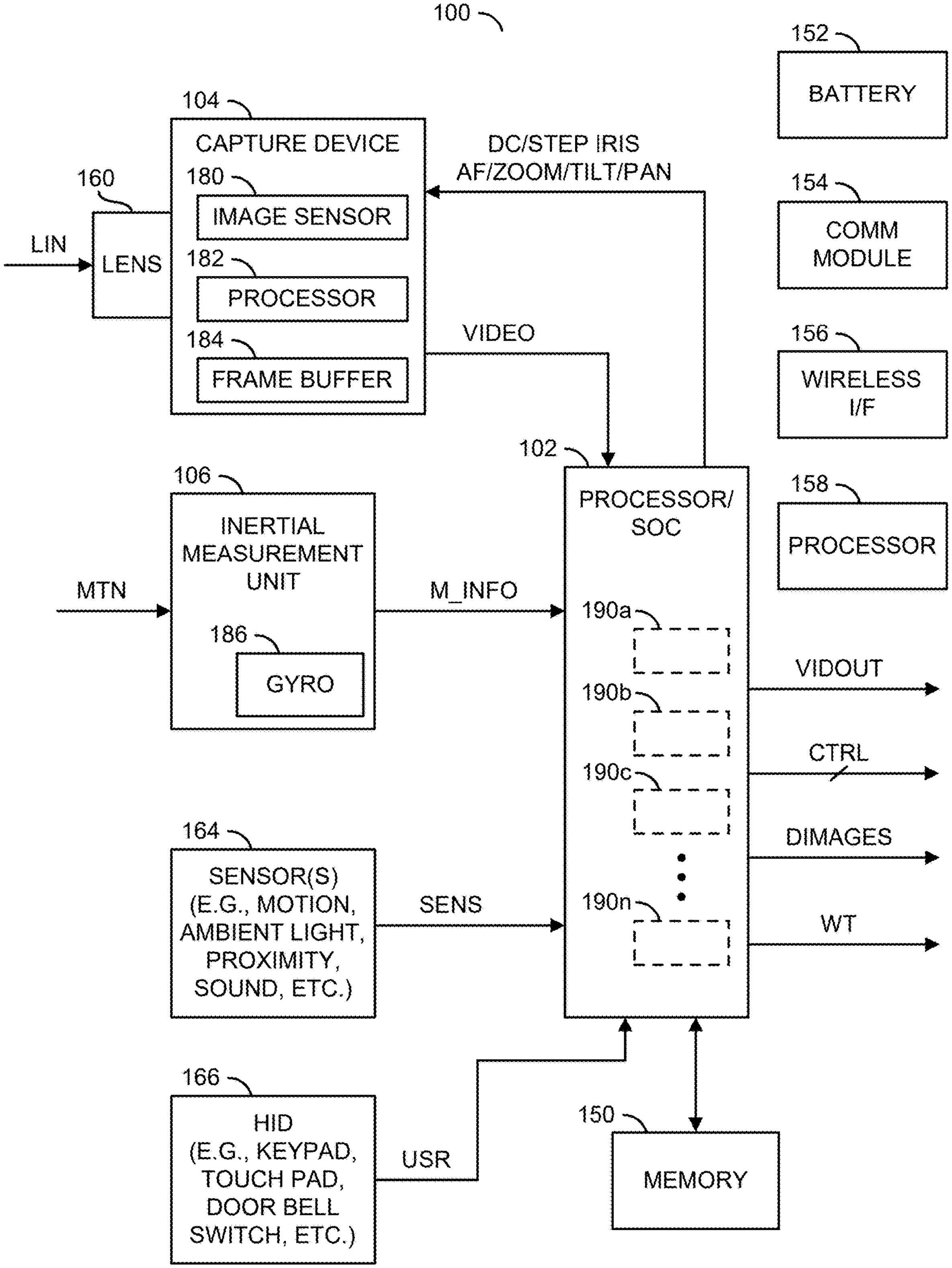
FIG. 4 is a block diagram illustrating a camera system.

Referring to FIG. 4, a block diagram illustrating a camera system is shown. The camera system (or apparatus) 100 may be a representative example of the cameras 100*a*-100*n* shown in association with FIG. 2 and/or the cameras 100*a*-100*e* shown in association with FIG. 3. The camera system 100 may comprise the processor/SoC 102, the capture device 104, and the IMU 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The circuit 164 may implement one or more sensors. The circuit 166 may implement a human interface device (HID). In some embodiments, the camera system 100 may comprise the processor/SoC 102, the capture device 104, the IMU 106, the memory 150, the lens 160, the sensors 164, the battery 152, the communication module 154, the wireless interface 156 and the processor 158. In another example, the camera system 100 may comprise processor/SoC 102, the capture device 104, the IMU 106, the processor 158, the lens 160, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/video processing and/or radar signal processing.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets, radar data cubes, radar detections and/or metadata information. In some embodiments, the memory 150 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. In yet another example, the memory 150 may store instructions to perform transformational operations (e.g., Discrete Cosine Transform, Discrete Fourier Transform, Fast Fourier Transform, etc.). The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics and/or radar signal processing to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). In some embodiments, the processor 158 may implement an integrated digital signal processor (IDSP). For example, the IDSP 158 may be configured to implement a warp engine. Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. In some embodiments, the signal VIDEO may be images comprising a background (e.g., objects and/or the environment captured) and the speckle pattern generated by a structured light projector. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The IMU 106 may be configured to detect motion and/or movement of the camera system 100. The IMU 106 is shown receiving a signal (e.g., MTN). The signal MTN may comprise a combination of forces acting on the camera system 100. The signal MTN may comprise movement, vibrations, shakiness, a panning direction, jerkiness, etc. The signal MTN may represent movement in three dimensional space (e.g., movement in an X direction, a Y direction and a Z direction). The type and/or amount of motion received by the IMU 106 may be varied according to the design criteria of a particular implementation.

The IMU 106 may comprise a block (or circuit) 186. The circuit 186 may implement a motion sensor. In one example, the motion sensor 186 may be a gyroscope. The gyroscope 186 may be configured to measure the amount of movement. For example, the gyroscope 186 may be configured to detect an amount and/or direction of the movement of the signal MTN and convert the movement into electrical data. The IMU 106 may be configured to determine the amount of movement and/or the direction of movement measured by the gyroscope 186. The IMU 106 may convert the electrical data from the gyroscope 186 into a format readable by the processor 102. The IMU 106 may be configured to generate a signal (e.g., M_INFO). The signal M_INFO may comprise the measurement information in the format readable by the processor 102. The IMU 106 may present the signal M_INFO to the processor 102. The number, type and/or arrangement of the components of the IMU 106 and/or the number, type and/or functionality of the signals communicated by the IMU 106 may be varied according to the design criteria of a particular implementation.

The sensors 164 may implement a number of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication. The HID 166 may present a signal (e.g., USR) to the processor 102. The signal USR may comprise the input received by the HID 166.

In embodiments of the camera system 100 that implement a structured light projector, the structured light projector may comprise a structured light pattern lens and/or a structured light source. The structured source may be configured to generate a structured light pattern signal (e.g., a speckle pattern) that may be projected onto an environment near the camera system 100. The structured light pattern may be captured by the capture device 104 as part of the light input LIN. The structured light pattern lens may be configured to enable structured light generated by a structured light source of the structured light projector to be emitted while protecting the structured light source. The structured light pattern lens may be configured to decompose the laser light pattern generated by the structured light source into a pattern array (e.g., a dense dot pattern array for a speckle pattern).

In an example, the structured light source may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source may implement a near infrared (NIR) light source. In various embodiments, the light source of the structured light source may be configured to emit light with a wavelength of approximately 940 nanometers (nm), which is not visible to the human eye. However, other wavelengths may be utilized. In an example, a wavelength in a range of approximately 800-1000 nm may be utilized.

The processor/SoC 102 may receive the signal VIDEO, the signal M_INFO, the signal SENS, and the signal USR. The processor/SoC 102 may generate one or more video output signals (e.g., VIDOUT), one or more control signals (e.g., CTRL), one or more depth data signals (e.g., DIMAGES) and/or one or more warp table data signals (e.g., WT) based on the signal VIDEO, the signal M_INFO, the signal SENS, the signal USR and/or other input. In some embodiments, the signals VIDOUT, DIMAGES, WT and CTRL may be generated based on analysis of the signal VIDEO and/or objects detected in the signal VIDEO. In some embodiments, the signals VIDOUT, DIMAGES, WT and CTRL may be generated based on analysis of the signal VIDEO, the movement information captured by the IMU 106 and/or the intrinsic properties of the lens 160 and/or the capture device 104.

In various embodiments, the processor/SoC 102 may be configured to perform one or more of feature extraction, object detection, object tracking, electronic image stabilization, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data, the warp table data signal WT and/or the depth data signal DIMAGES comprising disparity maps and depth maps from the signal VIDEO. The video output signal VIDOUT the warp table data signal WT and/or the depth data signal DIMAGES may be presented to the memory 150, the communications module 154, and/or the wireless interface 156. In some embodiments, the video signal VIDOUT the warp table data signal WT and/or the depth data signal DIMAGES may be used internally by the processor 102 (e.g., not presented as output). In one example, the warp table data signal WT may be used by a warp engine implemented by a digital signal processor (e.g., the processor 158).

The signal VIDOUT may be presented to the communication module 154 and/or the wireless interface 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). Similarly other video processing and/or encoding operations (e.g., stabilization, compression, stitching, cropping, rolling shutter effect correction, etc.) may be performed by the processor 102 locally. For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, stabilized video frames, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the IMU 106, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, Etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation.

The processor 102 is shown comprising a number of blocks (or circuits) 190*a*-190*n*. The blocks 190*a*-190*n* may implement various hardware modules implemented by the processor 102. The hardware modules 190*a*-190*n* may be configured to provide various hardware components to implement a video processing pipeline, a radar signal processing pipeline and/or an AI processing pipeline. The circuits 190*a*-190*n* may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190*a*-190*n* may be configured to implement various security features (e.g., secure boot, I/O virtualization, etc.). Various implementations of the processor 102 may not necessarily utilize all the features of the hardware modules 190*a*-190*n*. The features and/or functionality of the hardware modules 190*a*-190*n* may be varied according to the design criteria of a particular implementation. Details of the hardware modules 190a-190n may be described in association with U.S. Pat. application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules 190*a*-190*n* may be implemented as dedicated hardware modules. Implementing various functionality of the processor 102 using the dedicated hardware modules 190*a*-190*n* may enable the processor 102 to be highly optimized and/or customized to limit power consumption, reduce heat generation and/or increase processing speed compared to software implementations. The hardware modules 190*a*-190*n* may be customizable and/or programmable to implement multiple types of operations. Implementing the dedicated hardware modules 190*a*-190*n* may enable the hardware used to perform each type of calculation to be optimized for speed and/or efficiency. For example, the hardware modules 190*a*-190*n* may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190*a*-190*n* may enable computationally intensive operations (e.g., computer vision operations, video encoding, video transcoding, 3D reconstruction, depth map generation, liveness detection, etc.) to be performed locally by the camera system 100.

One of the hardware modules 190*a*-190*n* (e.g., 190*a*) may implement a scheduler circuit. The scheduler circuit 190*a* may be configured to store a directed acyclic graph (DAG). In an example, the scheduler circuit 190*a* may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are “structure agnostic” in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

One or more of the hardware modules 190*a*-190*n* may be configured to implement other types of AI models. In one example, the hardware modules 190*a*-190*n* may be configured to implement an image-to-text AI model and/or a video-to-text AI model. In another example, the hardware modules 190*a*-190*n* may be configured to implement a Large Language Model (LLM). Implementing the AI model(s) using the hardware modules 190*a*-190*n* may provide AI acceleration that may enable complex AI tasks to be performed on an edge device such as the edge devices 100*a*-100*n*.

One of the hardware modules 190*a*-190*n* may be configured to perform the virtual aperture imaging. One of the hardware modules 190*a*-190*n* may be configured to perform transformation operations (e.g., FFT, DCT, DFT, etc.). The number, type and/or operations performed by the hardware modules 190*a*-190*n* may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogeneous processing resources (all circuits 190*a*-190*n* may have the same capabilities) or heterogeneous processing resources (two or more circuits 190*a*-190*n* may have different capabilities).

Figure 5:
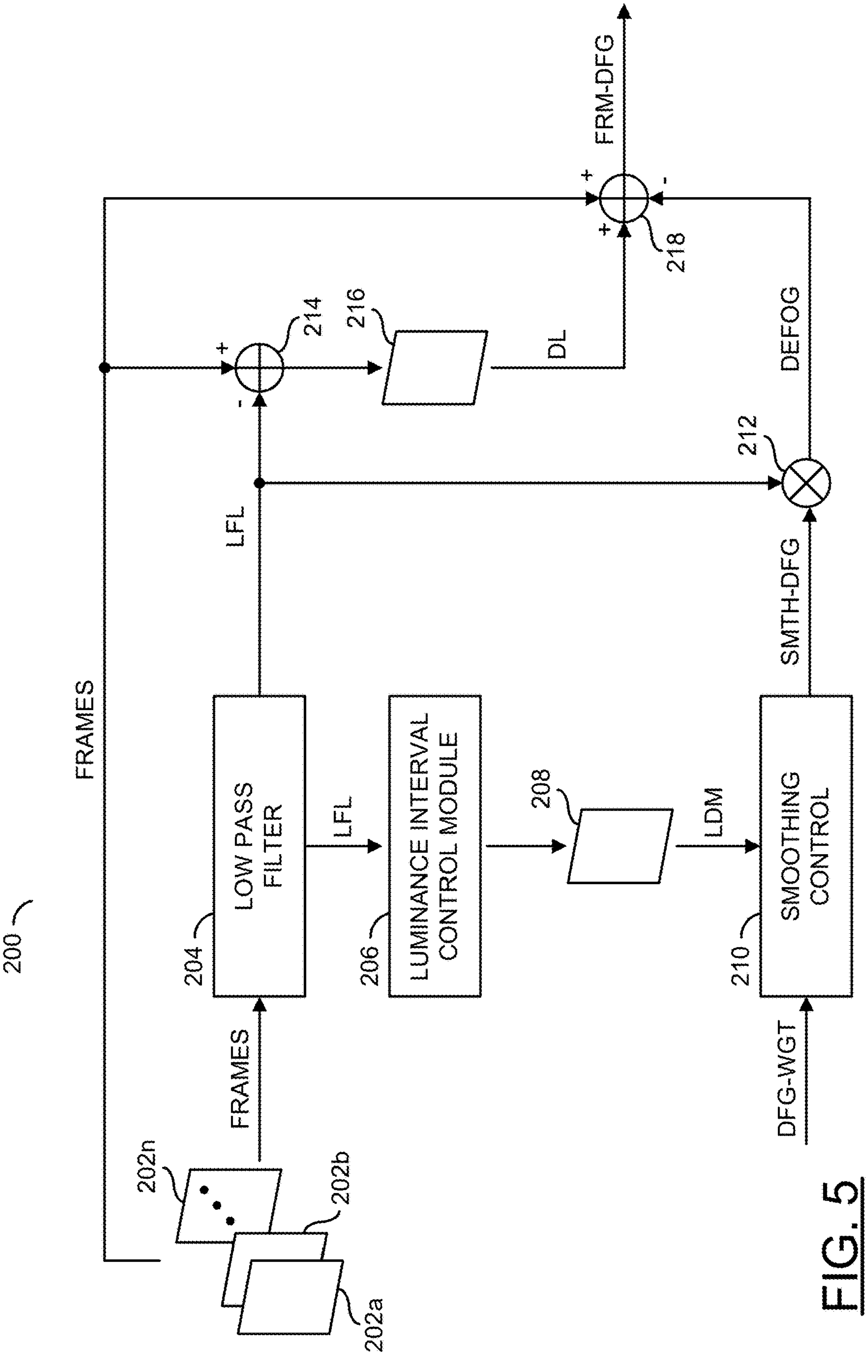
FIG. 5 is a block diagram illustrating operations for a high performance and low complexity adaptive video image defogging.

Referring to FIG. 5, a block diagram illustrating operations for a high performance and low complexity adaptive video image defogging is shown. A block diagram 200 is shown. The block diagram 200 may implement a video defogging module. The video defogging module 200 may be implemented as one or more of the hardware modules 190*a*-190*n* of the processor 102. The video defogging module 200 may be configured to implement the high performance and low complexity adaptive video defogging.

The video defogging module 200 may be configured to receive a number of video frames 202*a*-202*n*. The video frames 202*a*-202*n* may be generated in response to the signal VIDEO. In an example, the video processing pipeline of the processor 102 may be configured to process pixel data arranged as the video frames 202*a*-202*n*. The pixel data may be generated by and/or received from the image sensor 180. In some embodiments, the video processing pipeline may be configured to perform various pre-processing operations on the pixel data before (or after) the defogging operations performed by the video defogging module 200. In one example, the video defogging module 200 may be a module implemented as part of the video processing pipeline. The video frames 202*a*-202*n* may be transmitted within the processor 102 as a signal (e.g., FRAMES). The signal FRAMES may comprise the image input data. For example, the video frames 202*a*-202*n* may comprise video frames that have not been defogged (e.g., foggy input video frames).

The video defogging module 200 may comprise a block (or circuit) 204, a block (or circuit) 206, a block 208, a block (or circuit) 210, a block (or circuit) 212, a block (or circuit) 214, a block 216 and/or a block (or circuit) 218. The circuit 204 may implement a low pass filter. The circuit 206 may implement a luminance interval control module. The block 208 may be a luminance distribution map. The circuit 210 may implement a smoothing control module. The circuit 212 may implement a multiplication module. The circuit 214 may implement a summing module. The block 216 may be a detail layer. The circuit 218 may implement a summing module. The video defogging module 200 may comprise other components (not shown). The number, type and/or arrangement of the components of the video defogging module 200 may be varied according to the design criteria of a particular implementation.

The video defogging module 200 may be configured to divide the input image data in the signal FRAMES into a high-frequency detail layer and a low-frequency luminance layer. The signal FRAMES may be presented to the low pass filter 204, the summing module 214 and the summation module 218. The video defogging module 200 may be configured to receive a signal (e.g., DFG-WGT). The signal DFG-WGT may comprise defogging strength control points. The video defogging module 200 may be configured to generate a signal (e.g., FRM-DFG). The signal FRM-DFG may be defogged video frames. The video defogging module 200 may be configured to generate the defogged video frames in the signal FRM-DFG in response to the signal FRAMES and the signal DFG-WGT.

The low pass filter 204 may be configured to perform a low-pass filter operation. The low pass filter 204 may be configured to generate a low frequency layer in response to blocking high frequencies of an input and allowing low frequencies of an input to pass. The low pass filter 204 may be configured to perform filtering on the signal FRAMES. The low pass filter 204 may generate a signal (e.g., LFL). The signal LFL may communicate a low frequency layer. For example, the low frequency data of the input video frames 202*a*-202*n* may appear blurry and/or lacking in detail without the high frequency content. The low frequency layer may provide a representation of various brightness positions of the video frames 202*a*-202*n*. The signal LFL may be presented to the luminance interval control module 206, the summation point 214 and/or the multiplication module 212.

The low pass filter 204 may have a cut-off frequency. For example, video data in the video frames 202*a*-202*n* that corresponds to frequencies above the cut-off frequency may be blocked while frequencies below the cut-off frequency may pass through as the low frequency layer. The value of the cut-off frequency may be an adjustable parameter. Generally, the value of the cut-off frequency may depend on the actual scene captured in the video frames 202*a*-202*n*. For example, the cut-off frequency may be related to an image size and/or frame rate of the video frames 202*a*-202*n*. The processor 102 may adjust the cut-off frequency in response to the size and/or frame rate of the video frames 202*a*-202*n* generated by the image sensor 180. In one example, if the video frames 202*a*-202*n* have an image size of 4 k (e.g., 3840×2160) and have a frame rate of 30 fps, the cut-off frequency set for the low pass filter 204 may be approximately 60 MHZ. In another example, if the video frames 202*a*-202*n* have an image size of 1920×1080 and the frame rate is 30 fps, the cut-off frequency of the low pass filter 204 may be approximately 15 MHZ. In some embodiments, the cut-off frequency may be a parameter that may be adjustable automatically by the processor 102 (e.g., in response to detecting image size and/or frame rate information and/or settings of the image sensor 180). In some embodiments, the cut-off frequency may be a parameter that may be adjustable by user control (e.g., via input from the signal USR). The particular value of the cut-off frequency of the low pass filter 204 and/or the method of adjusting the cut-off frequency parameter may be varied according to the design criteria of a particular implementation.

The luminance interval control module 206 may receive the signal LFL. The luminance interval control module 206 may be configured to generate the luminance distribution map 208 in response to the low frequency layer. The luminance distribution map 208 may be generated in response to luminance levels in the low frequency layer based on an image position distribution (e.g., the location of the luminance values in a particular video frame). The output statistics of the luminance levels based on the image position may comprise the luminance distribution map 208. The luminance interval control module 206 may set the luminance interval based on an actual application implemented. The luminance interval control module 206 may provide the number of luminance intervals (e.g., N). The number (e.g., N) of luminance intervals may be an adjustable parameter. In one example, the processor 102 may automatically set the number of luminance intervals. In another example, the number of luminance intervals may be adjustable by user control (e.g., via input from the signal USR). The luminance distribution map 208 may be communicated as a signal (e.g., LDM). The signal LDM may be generated in response to the signal LFL.

After the original (e.g., foggy) video frames 202*a*-202*n* are filtered by the low pass filter 204, the luminance distribution map 208 of the current image may be based on the low frequency layer LFL. The luminance value in the luminance distribution map 208 may be sorted from dark to bright, and each luminance value in the luminance distribution map 208 may correspond to one of the intervals in all N luminance intervals.

The smoothing control module 210 may be configured to determine defogging intensity weights for the luminance distribution map 208. The smoothing control module 210 may be configured to perform adaptive smoothing to each of the defogging intensity weights. The smoothing control module 210 may be configured to receive the signal LDM and/or the signal DFG-WGT. The smoothing control module 210 may be configured to generate a signal (e.g., SMTH-DFG). The signal SMTH-DFG may comprise the defogging intensity weights with adaptive smoothing applied.

The smoothing control module 210 may be configured to sort the luminance distribution map 208 of the video frames 202*a*-202*n* from dark to bright. The smoothing control module 210 may be configured to divide the luminance distribution map 208 into multiple luminance intervals. For example, the luminance distribution map 208 may be divided into N intervals. The number (e.g., N) of intervals for the luminance distribution map 208 may be an adjustable value based on the available luminance values. For example, if the luminance values have a range from 0-255 (e.g., 0 for the darkest and 255 for the brightest), and the luminance interval is set to a value of 2, then the number N may be 128 (e.g., N=256/2). For example, the luminance interval control module 206 may set the luminance interval based on the application implemented. The luminance interval control module 206 may set the number N of luminance intervals. The particular luminance interval used may be varied according to the design criteria of a particular implementation.

A control point for defogging intensity may be set for each luminance interval. The control point for each interval may be adjustable parameters provided in the signal DFG-WGT. In some embodiments, the control point for defogging intensity may be set automatically by the processor. In some embodiments, the control point for defogging intensity may be a user adjustable value. The signal DFG-WGT may be an input argument value for the control points to provide the weight of the defogging strength. For example, if the smoothing defogging control strength for the N luminance intervals is set, the video defogging module 200 may adaptively determine the corresponding defogging strength based on the N luminance intervals for various different images that may have different luminance distribution maps.

In some embodiments, the signal DFG-WGT may provide the number of intervals to use and/or the defogging intensity strength for the intervals of the luminance distribution map 208. In an example, the signal DFG-WGT may be provided as a user input via the signal USR. In another example, the signal DFG-WGT may be pre-programmed in the memory 150 (e.g., based on engineering experience for providing accurate defogging). In yet another example, the signal DFG-WGT may be learned values (e.g., based on an AI model and training data) that determine appropriate control points for particular environmental factors (e.g., an amount of light in the environment, an amount of fog in the environment, user preference, etc.). The particular values selected for the control points in the signal DFG-WGT and/or the number of intervals selected may be varied according to the design criteria of a particular implementation.

The smoothing control module 210 may be configured to perform the adaptive smoothing for the control points based on curve fitting. For the selection of the weights of the control points (e.g., N defogging strength control points), the curve fitting may be applied. The curve fitting may be applied to the strength of the defogging control points. Smoothing the defogging control points may be implemented to ensure smoothness of image luminance distribution in the output defogged video frames. For example, the smoothing may prevent a large change in image brightness differences (e.g., avoid local regions with high contrast differences). Any local regions with high contrast differences may appear unnatural and may be distracting to an end-user.

In one example, the curve fitting may be performed based on a Bezier curve. The Bezier curve generally provides curve smoothing in drawing software. The Bezier curve may be re-configured from drawing software to be used to provide the adaptive curve-fitting for setting the strength of the control points. In some embodiments, the signal DFG-WGT may enable a selection of the order of the Bezier curve (or other curve fitting techniques that may be implemented such as B-spline, Lanczos, Catmull-Rom splines, etc.). In some embodiments, the memory 150 may comprise a lookup table providing a selection of an order of the Bezier curve based on the number of luminance intervals and/or the particular defogging strength control points. In some embodiments, the processor 102 may implement an AI model trained to select the order of the Bezier curve for a particular application and/or based on characteristics of the video frames 202*a*-202*n* and/or a trade off between output image quality and the available computational resources. The method of selecting the order for the Bezier curve may be varied according to the design criteria of a particular implementation.

Generally, selecting a higher order for the Bezier curve may provide smoother fitting for the strength of the control points. However, selecting a higher order may increase complexity, which results in the consumption of more hardware resources compared to a lower order for the Bezier curve. The smoothing control module 210 may be configured to balance the smoothness of the curve fitting and the consumption of hardware resources in order to provide high quality defogging for the output video frames with limited complexity. Since the defogging strength value for the control points may be adjustable, the amount of remaining fog in the output video frames may be adjustable. Setting the defogging strength value to higher values may result in some areas of the defogged video frames having reduced brightness and/or detail. For example, the amount of defogging intensity may reduce the brightness, which may cause a contrast reduction of details in dark regions of the defogged video frames.

The smoothing control module 210 may be configured to defog the entire luminance distribution according to the N defogging strength control weights that have been smoothed by the curve fitting. In the corresponding image luminance intervals, the control weights may be fit based on the luminance distribution map 208. The fitting may be implemented in real time to obtain the self-adaptive video image defogging control based on the image position and luminance distribution. The signal SMTH-DFG may be presented to the multiplication module 212 in response to the signal LDM, the signal DFG-WGT and the curve fitting applied.

The multiplication module 212 may be configured to perform a multiplication operation. The multiplication module 212 may receive the signal SMTH-DFG and the signal LFL. For example, the multiplication module 212 may be configured to perform a multiplication of the adaptively smoothed defogging intensity weights and the low frequency layer. For example, the smoothed defogging intensity weights (e.g., the signal SMTH-DFG) may be based on the low frequency layer (e.g., the signal LFL). Each corresponding luminance interval in the low frequency layer may be multiplied by the corresponding smoothed defogging intensity weight in the multiplication module 212. The multiplication module 212 may be configured to generate a signal (e.g., DEFOG). The signal DEFOG may comprise a result of the application of the adaptively smoothed defogging intensity weights. For example, the signal DEFOG may provide the defogging result. The signal DEFOG may comprise information corresponding to the fog in the video frames 202*a*-202*n* that may be removed. The signal DEFOG may be presented to the summation module 218.

The summation module 214 may be configured to receive the signal FRAMES and the signal LFL. The summation module 214 may be configured to subtract the low frequency layer from the video frames 202*a*-202*n*. The summation module 214 may generate the detail layer 216. The detail layer 216 may be a high frequency detail layer. For example, the detail layer 216 may remain after subtracting the low frequency layer from the video frames 202*a*-202*n*. The detail layer 216 may be communicated via a signal (e.g., DL). The detail layer 216 may comprise details of the video frames 202*a*-202*n* corresponding to high frequency information. For example, the detail layer 216 may comprise fine details about textures, edges (e.g., abrupt changes between adjacent pixels) and/or other intricate visual information. The detail layer 216 may define object boundaries and/or provide overall clarity and definition of visual elements. The signal DL may be generated in response to the signal FRAMES and the signal LFL. The signal DL may be presented to the summation module 218.

The summation point 218 may be configured to receive the signal FRAMES, the signal DL and/or the signal DEFOG. The summation module 218 may be configured to subtract the defogging result generated in response to the adaptively smoothed defogging intensity weights from the video frames 202*a*-202*n* and the detail layer 216. The summation module 218 may generate the defogged output video frames. The defogged output video frames may be communicated via the signal FRM-DFG. The defogged output video frames may comprise the video data of the video frames 202*a*-202*n* with the blur caused by the fog in the environment removed (or partially removed).

The high frequency layer may be added to the final result to maintain the original image details after the fog has been removed. The high frequency layer may be added to the image processing result after applying the adaptively smoothed defogging control weights. For example, the high frequency layer may not be added directly to the defogging weights, but rather the defogging result (e.g., the multiplication of the smoothed defogging weights with the low frequency layer). The video frames 202*a*-202*n* in the signal FRAMES may comprise the high frequency data and the low frequency data. The defogging result may first be subtracted from the video frames 202*a*-202*n* by the summation point 218. After subtracting the defogging result, the original high frequency details may be lost (or partially lost depending on the defogging strength). To restore the loss of high frequency details based on the original high frequency layer, the detail layer 216 may be added by the summation point 218. The defogged output video frames in the signal FRM-DFG may comprise the video data with the defogging results removed, and the original high frequency details restored.

Figure 6:
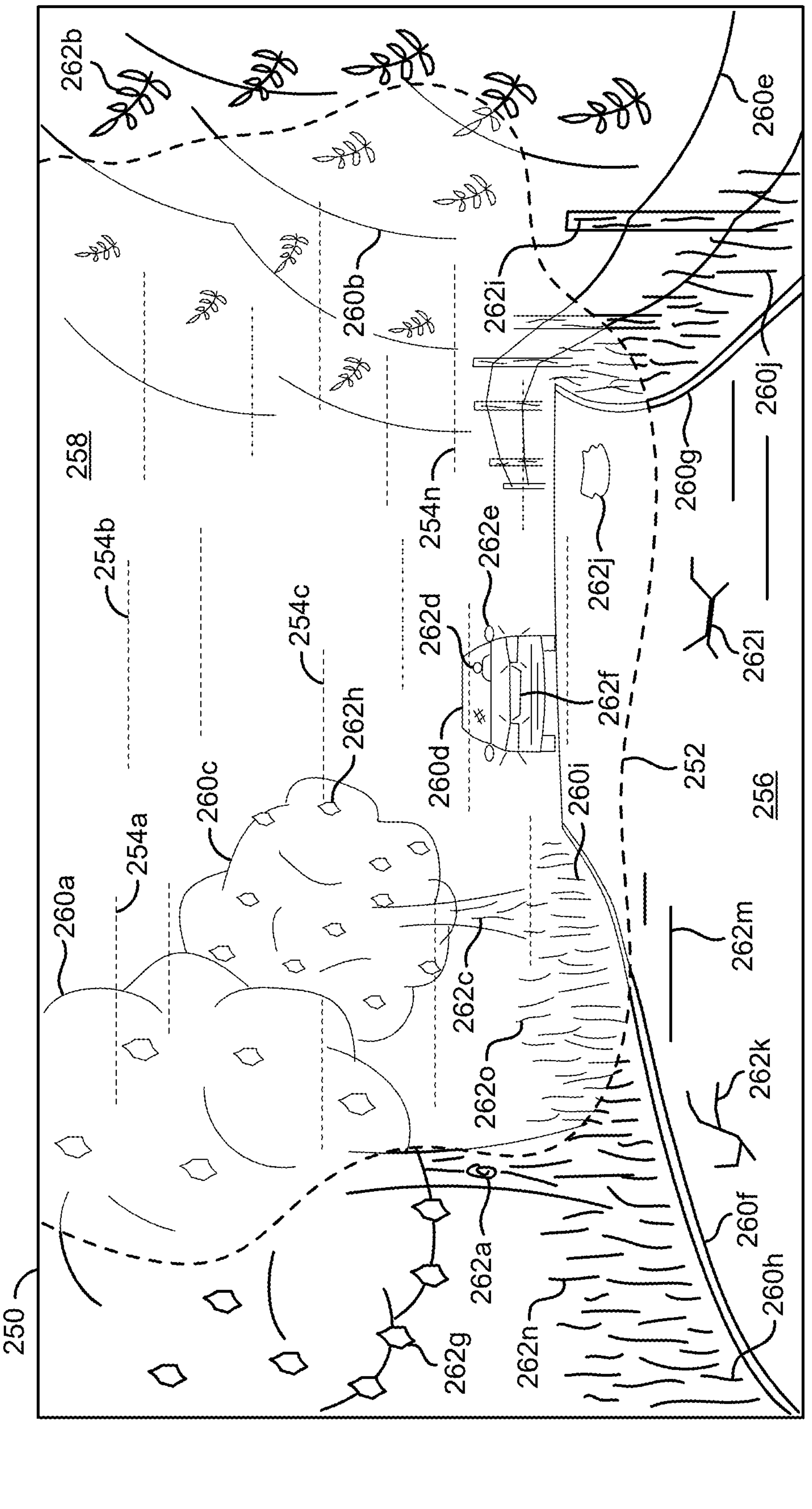
FIG. 6 is a diagram illustrating an example input video frame of a foggy environment.

Referring to FIG. 6, a diagram illustrating an example input video frame of a foggy environment is shown. An example video frame 250 is shown. The example video frame 250 may be one of the video frames 202*a*-202*n*. For example, the example video frame 250 may be an input video frame before removing fog (e.g., a foggy input video frame). The foggy input video frame 250 may be one of the video frames processed by the video defogging module 200 shown in association with FIG. 5.

The foggy input video frame 250 may comprise pixel data captured by the capture device 104. In one example, the foggy input video frame 250 may be provided to the processor 102 as the signal VIDEO. In another example, the foggy input video frame 250 may be generated by the processor 102 in response to the pixel data provided in the signal VIDEO. The pixel data may be received by the processor 102 and video processing operations may be performed by the video processing pipeline of the processor 102 to generate the foggy input video frame 250. In some embodiments, the foggy input video frame 250 may not be presented as human viewable video output to one or more video displays until the defogging operations have been performed by the video defogging module 200. In some embodiments, after the defogging operations have removed the fog, the foggy input video frame 250 may be utilized internal to the processor 102 to perform the computer vision operations and/or video analysis operations. The foggy input video frame 250 may comprise pixel data arranged as a video frame. The foggy input video frame 250 is shown as a visual representation (e.g., as viewed by a person on a video output device, such as a monitor, a touchscreen display, etc.). Generally, the processor 102 and/or the video defogging module 200 may perform operations on the pixel data and/or blocks of pixels.

Generally, the foggy input video frame 250 may comprise a video image of a vehicle driving on a roadway with trees and bushes on the side of the road. The environment in the foggy input video frame 250 may comprise foggy conditions. The foggy input video frame 250 may represent how a video output may look without defogging operations applied. For example, a view and/or details of the environment captured in the foggy input video frame 250 may be partially obstructed by the foggy conditions.

The foggy input video frame 250 may comprise a dashed line 252 forming an irregular shape. Dotted vertical lines 254*a*-254*n* are shown within the irregular shape 252. The irregular shape 252 and the dotted vertical lines 254*a*-254*n* may represent a fog effect. For example, the irregular shape 252 may illustrate a fog boundary and the dotted vertical lines 254*a*-254*n* may represent a partial visual obstruction caused by the fog. The partial visual obstruction caused by the fog may appear as a blur effect.

A video frame portion 256 is shown on one side of the fog boundary 252. The video frame portion 256 may comprise a clear conditions region. The clear conditions region 256 may not be obstructed by the fog. For example, the clear conditions region 256 may be outside of the fog effect. The various objects, view distance and/or visual details in the clear conditions region 256 may appear clear.

A video frame portion 258 is shown on one side of the fog boundary 252 (e.g., opposite to the clear conditions region 256). The video frame portion 258 may comprise a foggy conditions region. The foggy conditions region 258 may have some degree of visual obstruction caused by fog (or other types of humidity). For example, the foggy conditions region 258 may be within the fog effect. The various objects, view distance and/or visual details in the foggy conditions region 258 may appear blurry, may be more difficult to see and/or may be more difficult to distinguish compared to similar objects that may be in the clear conditions region 256.

As an illustrative example, portions of the foggy input video frame 250 and/or objects located in the clear conditions region 256 may be drawn with thicker lines than the lines used to draw objects located in the foggy conditions region 258. The difference in thickness in lines in the clear conditions region 256 and the foggy conditions region 258 may provide a visual indication that objects, characteristics and/or features may be blurred and/or difficult to interpret and/or view distances may be shorter in the foggy conditions region 258. The amount and/or type of visual differences caused by the fog may be varied according to the environmental conditions in the captured environment.

The foggy input video frame 250 may comprise a combination of low frequency image content and high frequency image content. The combination of the low frequency image content and the high frequency image content may result in the foggy input video frame 250 appearing natural (e.g., similar to what a person would see when viewing the environment captured in the foggy input video frame 250). The foggy input video frame 250 may comprise a number of visual details 260*a*-260*j* and a number of visual details 262*a*-262*o*. The visual details 260*a*-260*j* may represent low frequency image content. The visual details 262*a*-262*o* may represent high frequency image content. The low frequency image content 260*a*-260*j* and the high frequency image content 262*a*-262*o* may be shown as illustrative examples of the different types of visual content in the foggy input video frame 250. For example, the low frequency image content 260*a*-260*j* may not represent all of the low frequency image content in the foggy input video frame 250 and the high frequency image content 262*a*-262*o* may not represent all of the high frequency image content. Generally, in video frame captured by the apparatus 100, the low frequency image content and the low frequency image content may have different visual characteristics than the representative examples shown in the low frequency image content 260*a*-260*j* and the high frequency image content 262*a*-262*o*.

The low frequency image content 260*a*-260*j* may be in both the clear conditions region 256 and the foggy conditions region 258. In the example shown, the low frequency image content 260*a* may be a tree, the low frequency image content 260*b* may be bushes, the low frequency image content 260*c* may be a tree, the low frequency image content 260*d* may be a vehicle (e.g., a sedan style car), the low frequency image content 260*e* may be a wire fence with wooden posts, the low frequency image content 260*f* may be a road side, the low frequency image content 260*g* may be a road side, and the low frequency image content 260*h*-260*j* may be nearby vegetation. For example, the nearby vegetation 260*h* may be shown with more clarity (e.g., thicker lines) in the clear conditions region 256 and the nearby vegetation 260*i* may be shown with less clarity (e.g., thinner lines) in the foggy conditions region 258. In another example, the tree 260*a* is shown partially in the clear conditions region 256 and the foggy conditions region 258 and the portion of the tree 260*a* may appear less clearly (e.g., thinner lines) in the foggy conditions region 258 than the portion in the clear conditions region 256.

The high frequency image content 262*a*-262*o* may be in both the clear conditions region 256 and the foggy conditions region 258. In the example shown, the high frequency image content 262*a* may be wood grain patterns of a tree, the high frequency image content 262*b* may be leaf details of a bush, the high frequency image content 262*c* may be wood grain patterns of a tree, the high frequency image content 262*d* may be a driver of a vehicle, the high frequency image content 262*e* may be smaller visual characteristics (e.g., sideview mirrors) of the vehicle, the high frequency image content 262*f* may be design features of the vehicle, the high frequency image content 262*g*-262*h* may be leaves on trees, the high frequency image content 262*i* may be wood grain on fence posts, the high frequency image content 262*j* may be a puddle, the high frequency image content 262*k*-262*l* may be road cracks, the high frequency image content 262*m* may be road lines and the high frequency image content 262*n*-262*o* may be distant vegetation. For example, the distant vegetation 262*n* may be shown with more clarity (e.g., thicker lines) in the clear conditions region 256 and the distant vegetation 262*o* may be shown with less clarity (e.g., thinner lines) in the foggy conditions region 258. In another example, the leaves on trees 262*g* is shown partially in the clear conditions region 256 and the foggy conditions region 258 and the portion of the leaves on trees 262*g* may appear less clearly (e.g., thinner lines) in the foggy conditions region 258 than the portion in the clear conditions region 256.

The foggy input video frame 250 may be presented to the low pass filter 204, the summation module 214 and/or the summation module 218. The low pass filter 204 may be configured to separate out the low frequency image content 260*a*-260*j* from the high frequency image content 262*a*-262*o*. The video defogging module 200 may be configured to perform operations based on the low frequency image content 260*a*-260*j* and the high frequency image content 262*a*-262*o* to generate the defogged output video frames.

Figure 7:
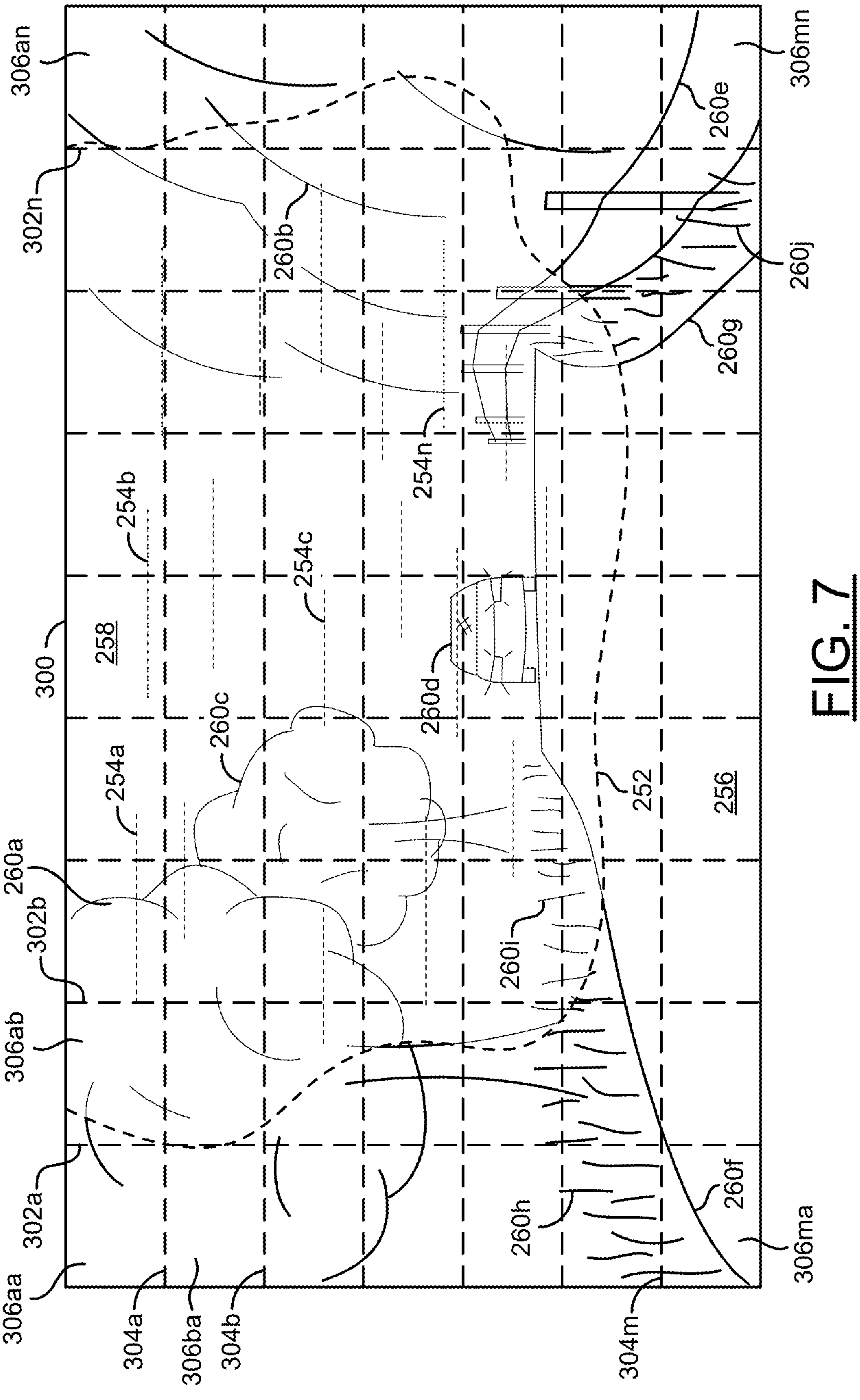
FIG. 7 is a diagram illustrating regions of a low frequency layer of the input video frame for a luminance distribution map.

Referring to FIG. 7, a diagram illustrating regions of a low frequency layer of the input video frame for a luminance distribution map is shown. An example low frequency layer 300 is shown. The example low frequency layer 300 may be communicated in the signal LFL. The example low frequency layer 300 may be generated from one of the video frames 202*a*-202*n*. In the example shown, the low frequency layer 300 may be generated from the foggy input video frame 250 shown in association with FIG. 5.

The foggy input video frame 250 may be presented to the low pass filter 204. The low pass filter 204 may block the high frequency image content and pass the low frequency layer in the signal LFL. For example, the foggy input video frame 250 may be filtered by the low pass filter 204 at the cut-off frequency to generate the low frequency layer 300. The low frequency layer 300 may have similar visual content as the foggy input video frame 250 but with some visual content removed due to the filtering. The low frequency layer 300 may comprise the low frequency image content 260*a*-260*j* of the foggy input video frame 250 without the high frequency image content 262*a*-262*o*. For example, the high frequency image content 262*a*-262*o* may be filtered out of the foggy input video frame 250 to generate the low frequency layer 300.

The low frequency layer 300 may comprise data about an overall structure and/or broad features of the input video frames 202*a*-202*n*. Generally, the low frequency layer 300 may comprise an overall shape and/or structure of various objects and/or visual features. For example, the low frequency layer 300 may provide general outlines and/or large-scale forms in of the video frames 202*a*-202*n*. The low frequency layer 300 may provide broad areas of color (e.g., large regions with similar color and/or intensity). The low frequency layer 300 may provide gradual transitions (e.g., slow changes in brightness and/or color with respect to locations in the video frames 202*a*-202*n*). Characteristics of the low frequency layer 300 may comprise coarse details and/or a blurred appearance (e.g., compared to the original video content in the video frames 202*a*-202*n*). The low frequency layer 300 may comprise a general layout and composition of the video frames 202*a*-202*n* rather than fine details. Generally, the overall shape and/or structure provided by the low frequencies layer 300 may be sufficient to identify large objects (e.g., using computer vision operations) in the video frames 202*a*-202*n*.

In the example shown, the low frequency layer 300 may provide the low frequency image content 260*d* of the vehicle, which may provide a general shape of the vehicle (e.g., a shape of a sedan), but may not provide the fine details of the vehicle of the high frequency image contents 262*e*-262*f* of the vehicle (e.g., the side view mirrors and/or the vehicle design details may be missing). Similarly, the low frequency layer 300 may provide the low frequency image content 260*f*-260*g* of the shape of the road, but may not provide fine details of the high frequency image contents 262*j*-262*m* (e.g., cracks, lines, puddles, etc.). The amount of details shown in the low frequency layer 300 may be varied according to the environment captured and/or a cut-off frequency of the low pass filter 204.

The fog effect 254*a*-254*n* may be in the low frequency layer 300. For example, the details of the fog effect 254*a*-254*n* may be extracted from the low frequency layer 300 to determine the control point strength in order to remove the fog effect 254*a*-254*n*.

The low frequency layer 300 may be presented to the luminance interval control module 206. The luminance interval control module 206 may be configured to generate the luminance distribution map 208 in response to the low frequency layer 300. The luminance interval control module 206 may be configured to divide the low frequency layer 300 into multiple rectangular regions in order to obtain luminance values.

The low frequency layer 300 may comprise vertical lines 302*a*-302*n* and horizontal lines 304*a*-304*m*. The vertical lines 302*a*-302*n* and the horizontal lines 304*a*-304*m* may divide the low frequency layer into a number of regions 306*aa*-306*mn*. The regions 306*aa*-306*mn* may be rectangular regions that correspond to particular image positions in the low frequency layer 300. In the example shown, there may be more vertical lines 302*a*-302*n* than the horizontal lines 304*a*-304*m* (e.g., the image size has more pixels horizontally than pixels vertically). In some embodiments, the low frequency layer 300 may be divided into the rectangular regions 306*aa*-306*mn* based on having more of the horizontal lines 304*a*-304*m* than the vertical lines 302*a*-302*n*. The number of the rectangular regions 306*aa*-306*mn* may be related to the image size. For example, the size of the rectangular regions 306*aa*-306*mn* may be 16 pixels×16 pixels. The block size may be a fixed value. In one example, if the video frames 202*a*-202*n* are 4 k images (e.g., 3840×2160p), the number of horizontal rectangular regions 306*aa*-306*mn* may be 240 (e.g., 3840/16) and the number of the vertical rectangular regions 306*aa*-306*mn* may be 135 (e.g., 2160/16). The number of the regions 306*aa*-306*mn*, the size of the regions 306*aa*-306*mn* and/or an aspect ratio of each of the regions 306*aa*-306*mn* may be varied according to the design criteria of a particular implementation.

The luminance interval control module 206 may be configured to extract information about the low frequency layer 300 from the rectangular regions 306*aa*-306*mn*. Each of the regions 306*aa*-306*mn* may comprise position and/or brightness information about the foggy input video frame 250. For example, the region 306*aa* may provide brightness information for the top left position of the foggy input video frame 250. In another example, the region 306*mn* may provide brightness information for a bottom right position of the foggy input video frame 250. In yet another example, the region 306*ii* (not specifically labeled) may provide brightness information about a generally central position of the foggy input video frame 250. Output statistics from the regions 306*aa*-306*mn* may be used to generate the luminance distribution map 208.

Figure 8:
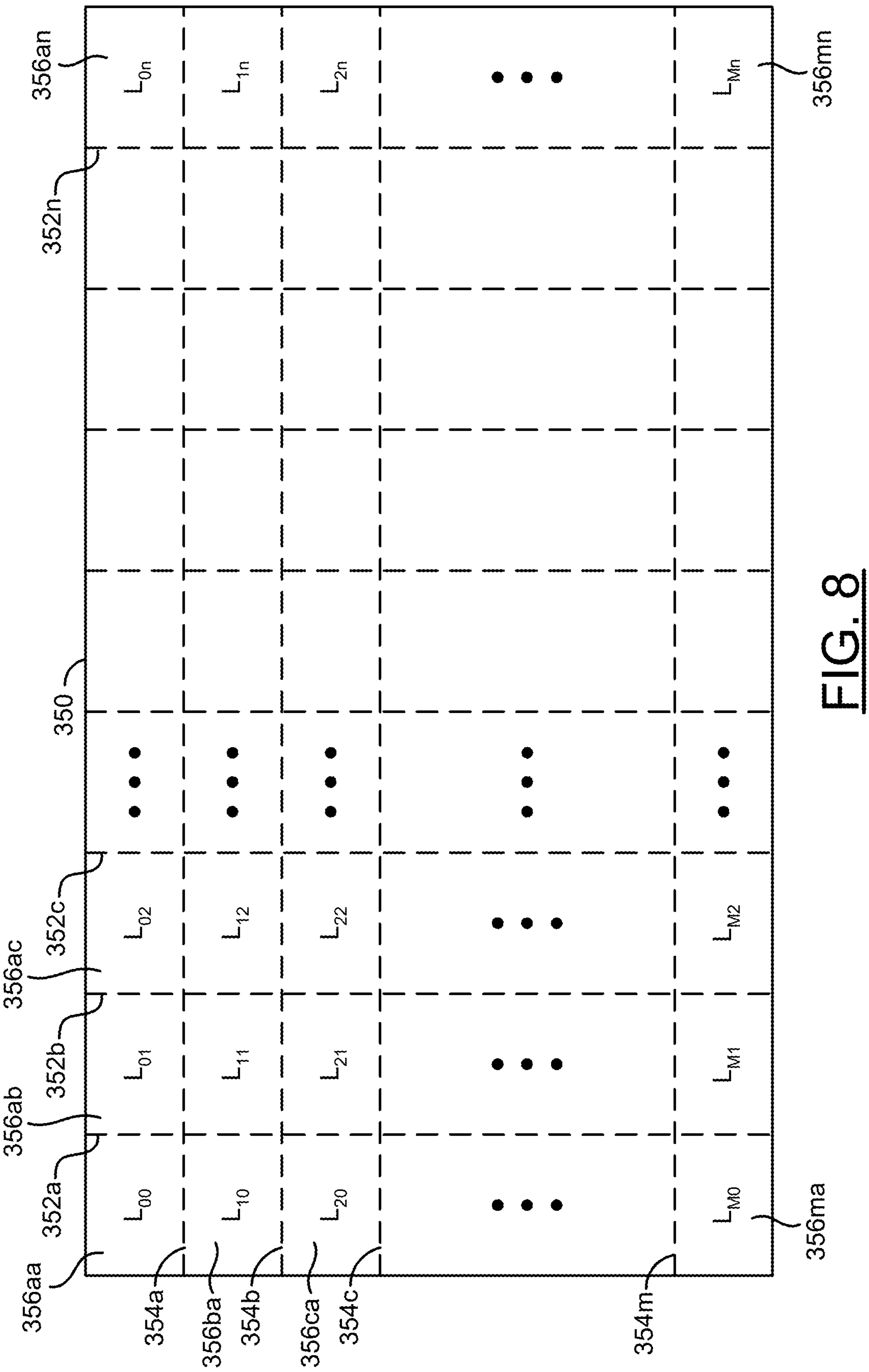
FIG. 8 is a diagram illustrating luminance values for a luminance distribution map.

Referring to FIG. 8, a diagram illustrating luminance values for a luminance distribution map is shown. An example distribution map 350 is shown. The distribution map 350 may be an illustrative example of the luminance distribution map 208. For example, the distribution map 350 may be generated by the luminance interval control module 206 in response to the low frequency layer 300.

The distribution map 350 may comprise a number of vertical lines 352*a*-352*n* and/or a number of horizontal lines 354*a*-354*m*. The vertical lines 352*a*-352*n* and the horizontal lines 354*a*-354*m* may divide the distribution map 350 into a number of regions 356*aa*-356*mn*. The regions 356*aa*-356*mn* may each comprise a luminance value L. In the example shown, the region 356*aa* may be a luminance value L00, the region 356*ab* may be a luminance value L01, the region 356*an* may be a luminance value L0n, the region 356*ba* may be a luminance value L10, the region 356*ma* may be a luminance value LM0, the region 356*mn* may be a luminance value Lmn, etc. In one example, each of the luminance values L00-Lmn may comprise a luminance value measured in cd/m$^2$. For example, the luminance values may have a range from 0.1 cd/m$^2$ to 500 cd/m$^2$ and/or a range from $10^{-5}$ cd/m$^2$ to $10^8$cd/m$^2$. In another example each of the luminance values L00-Lmn may be an encoded value. For example, the luminance values may be encoded to a value between 0-255. The particular luminance values may be varied according to the design criteria of a particular implementation.

The vertical lines 352*a*-352*n* of the distribution map 350 may correspond to the vertical lines 302*a*-302*n* of the low frequency layer 300. The horizontal lines 354*a*-354*m* of the distribution map 350 may correspond to the horizontal lines 304*a*-304*m* of the low frequency layer 300. The luminance value regions 356*aa*-356*mn* may correspond to the image position regions 306*aa*-306*mn* of the low frequency layer 300. Each of the luminance values L00-Lmn of the distribution map 350 may represent the luminance value at the corresponding image position regions 306*aa*-306*mn* of the low frequency layer 300. For example, the luminance distribution map 208 may be determined based on the multiple rectangular regions 306*aa*-306*mn* to obtain the corresponding luminance values L00-Lmn. The output statistics of the luminance levels may be the luminance values L00-Lmn based on the image position regions 306*aa*-306*mn* of the low frequency layer 300.

The smoothing control module 210 may receive the luminance values L00-Lmn of the luminance distribution map 208. The smoothing control module 210 may sort the luminance values L00-Lmn from dark to bright and divided into a number of luminance intervals (e.g., N luminance intervals). The smoothing control module 210 may set a control point for the amount of defogging intensity for each of the N luminance intervals. For example, the signal DFG-WGT may be an input argument providing the control point weights for the strength of the defogging. The control points may be the defogging intensity weights.

The smoothing control module 210 may provide the adaptive smoothing for the strength of the N defogging intensity weights. The smoothing control module 210 may perform fitting control for the defogging intensity weights. The fitting control may be based on the Bezier curve smoothing. The smoothing control module 210 may apply the Bezier curve smoothing to the setting for the defogging intensity weights. The Bezier curve smoothing may ensure a smoothness of the image luminance distribution after defogging is performed. For example, the adaptive smoothing performed using the Bezier curve may prevent large jumps (e.g., differences) in image brightness. The defogging intensity weights with adaptive smoothing may be generated for the signal SMTH-DFG.

The video frames 202*a*-202*n* may be defogged according to the defogging intensity weights with the adaptive smoothing applied based on the N luminance distribution intervals. For the corresponding image luminance intervals, the defogging intensity weights may be fitted based on the luminance distribution map 208 to provide the adaptive smoothing. Generating the defogging intensity weights with the adaptive smoothing may be performed in real time in order to provide the self-adaptive video image defogging control based on the image position and the luminance distribution. A multiplication operation by the multiplication module 212 may be performed between the defogging intensity weights with the adaptive smoothing and the low frequency layer 300. For example, the defogging intensity weights with adaptive smoothing in the signal SMTH-DFG may be multiplied by the low frequency layer 300 in the signal LFL to generate the signal DEFOG. The signal DEFOG may provide an amount of defogging for each position for each of the input video frames 202*a*-202*n* in real-time.

Figure 9:
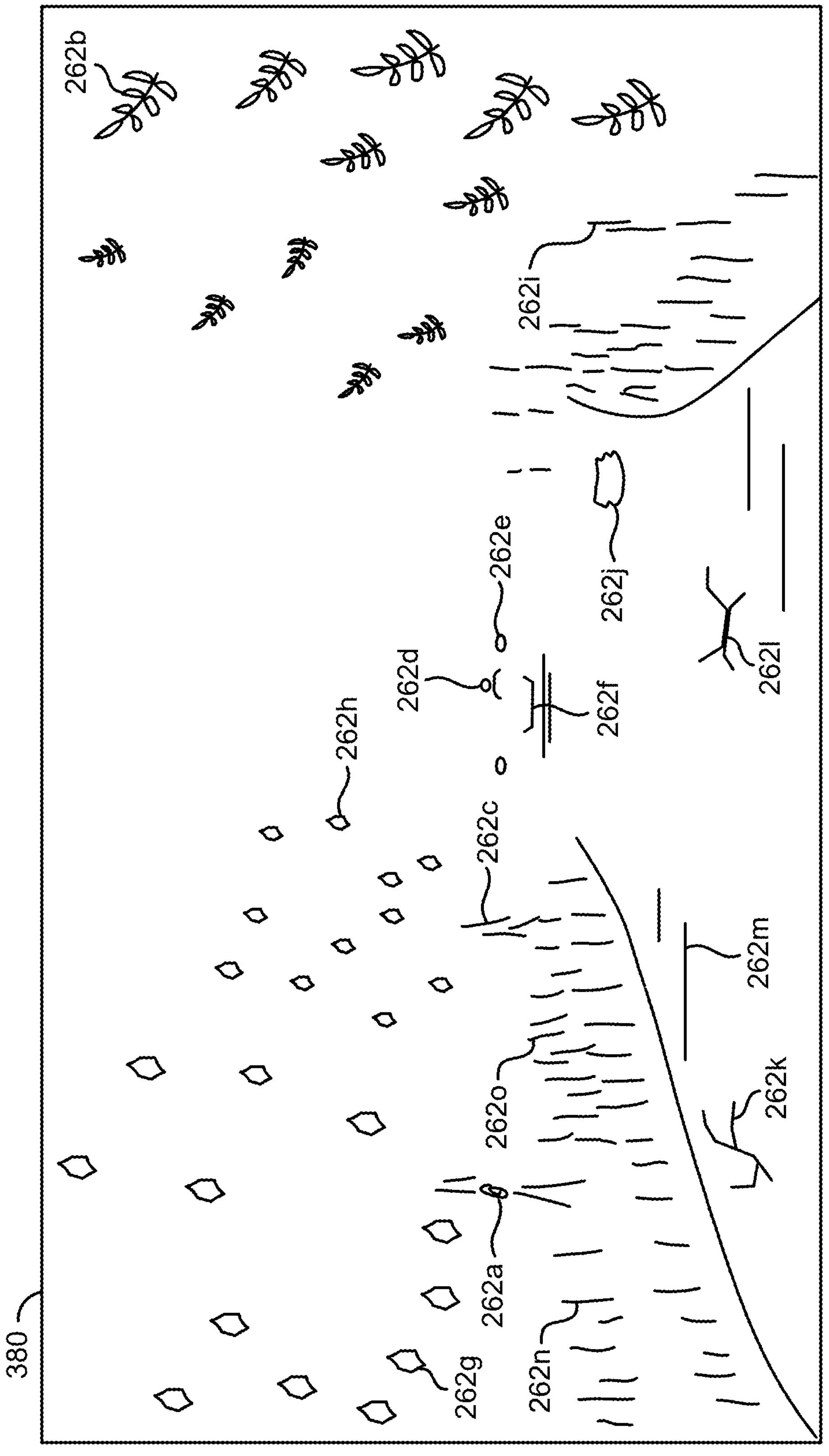
FIG. 9 is a diagram illustrating an example high frequency layer of an input video frame.

Referring to FIG. 9, a diagram illustrating an example high frequency layer of an input video frame is shown. A high frequency detail layer 380 is shown. The example high frequency detail layer 380 may be communicated in the signal DL. The example high frequency detail layer 380 may be generated from one of the video frames 202*a*-202*n*. In the example shown, the high frequency detail layer 380 may be generated from the foggy input video frame 250 shown in association with FIG. 5.

The foggy input video frame 250 may be presented to the low pass filter 204, the summing module 214 and the summation module 218. The low pass filter 204 may block the high frequency image content and pass the low frequency layer in the signal LFL. For example, the low frequency layer 300 may be generated by the low pass filter 204. The low frequency layer 300 may be subtracted from the foggy input video frame 250 (e.g., a corresponding one of the input video frames 202*a*-202*n*) by the summing module 214 to generate the high frequency detail layer 380. The high frequency detail layer 380 may be a representative example of the detail layer 216 shown in association with FIG. 5.

The high frequency detail layer 380 may have similar visual content as the foggy input video frame 250 but with some visual content removed due to the removal of the low frequency content of the low frequency layer 300. The high frequency detail layer 380 may comprise the high frequency image content 262_a_-262_o_ of the foggy input video frame 250 without the low frequency image content 260_a_-260_j_. For example, the low frequency image content 260_a_-260_j_ may be subtracted out of the foggy input video frame 250 to generate the high frequency detail layer 380.

The high frequency detail layer 380 may comprise data about fine details and/or sharp transitions of the input video frames 202_a_-202_n_. Generally, the high frequency detail layer 380 may comprise details and edge data. The high frequency detail layer 380 may appear visually as a gray image (e.g., mainly without color data). The high frequency detail layer 380 may correspond to areas of an image where pixel values change rapidly over short distances. For example, the pixel values may change rapidly in portions of the input image such as fine textures and intricate patterns, sharp edges and boundaries between objects, small features and minute details, etc. The high frequency detail layer 380 may provide visual characteristics. The high frequency detail layer 380 may provide details that correspond to image sharpness (e.g., high frequencies may comprise data for a crispness and clarity of an image). The high frequency detail layer 380 may provide contrast (e.g., abrupt changes in brightness and/or color may be captured in the high frequency data). The high frequency detail layer 380 may comprise noise (e.g., random variations and/or graininess in an image may be in the high frequency components). The high frequency detail layer 380 may represent rapid transitions between pixels and/or areas where intensity and/or color values fluctuate quickly across small regions in a spatial representation. Generally, the high frequency detail layer 380 may comprise data with lower magnitudes compared to data in the low frequency layer 300 (e.g., the high frequency data may contribute less to the overall image).

In the example shown, the high frequency detail layer 380 may provide the high frequency image content 262_a_ and the high frequency image content 262_g_ that may correspond to fine details of a tree (e.g., wood grain patterns), but without the general shape and structure of the tree (e.g., provided in the low frequency image content 260_a_). Similarly, fine details in the high frequency image content 262_d_-262_f_ (e.g., the driver in the vehicle, the side-view mirrors of the vehicle, and the design features of the vehicle) may be visible in the high frequency detail layer 380, but not the overall shape and/or structure of the vehicle (e.g., provided in the low frequency image content 260_d_). Similarly, the fine details and/or sharpness of the high frequency image content 262_j_-262_m_ (e.g., the puddle, the cracks and lines of the road) may be visible in the high frequency detail layer 380, but not the overall structure of the road (e.g., provided in the low frequency image content 260_f_-260_g_). The amount of details shown in the high frequency detail layer 380 may be varied according to the environment captured and/or a cut-off frequency of the low pass filter 204.

The fog effect 254_a_-254_n_ may not be visible in the high frequency detail layer 380. For example, the details of the fog effect 254_a_-254_n_ may be in the low frequency layer 300, which may be subtracted from the foggy input image 250 to generate the high frequency detail layer 380.

The high frequency detail layer 380 may be presented to the summation module 218. The high frequency detail layer 380 may be used to generate the defogged output video frames. The high frequency detail layer 380 may be used to restore high frequency details for the defogged output video frames after the defogging result is subtracted from the video frames 202_a_-202_n_.

Figure 10:
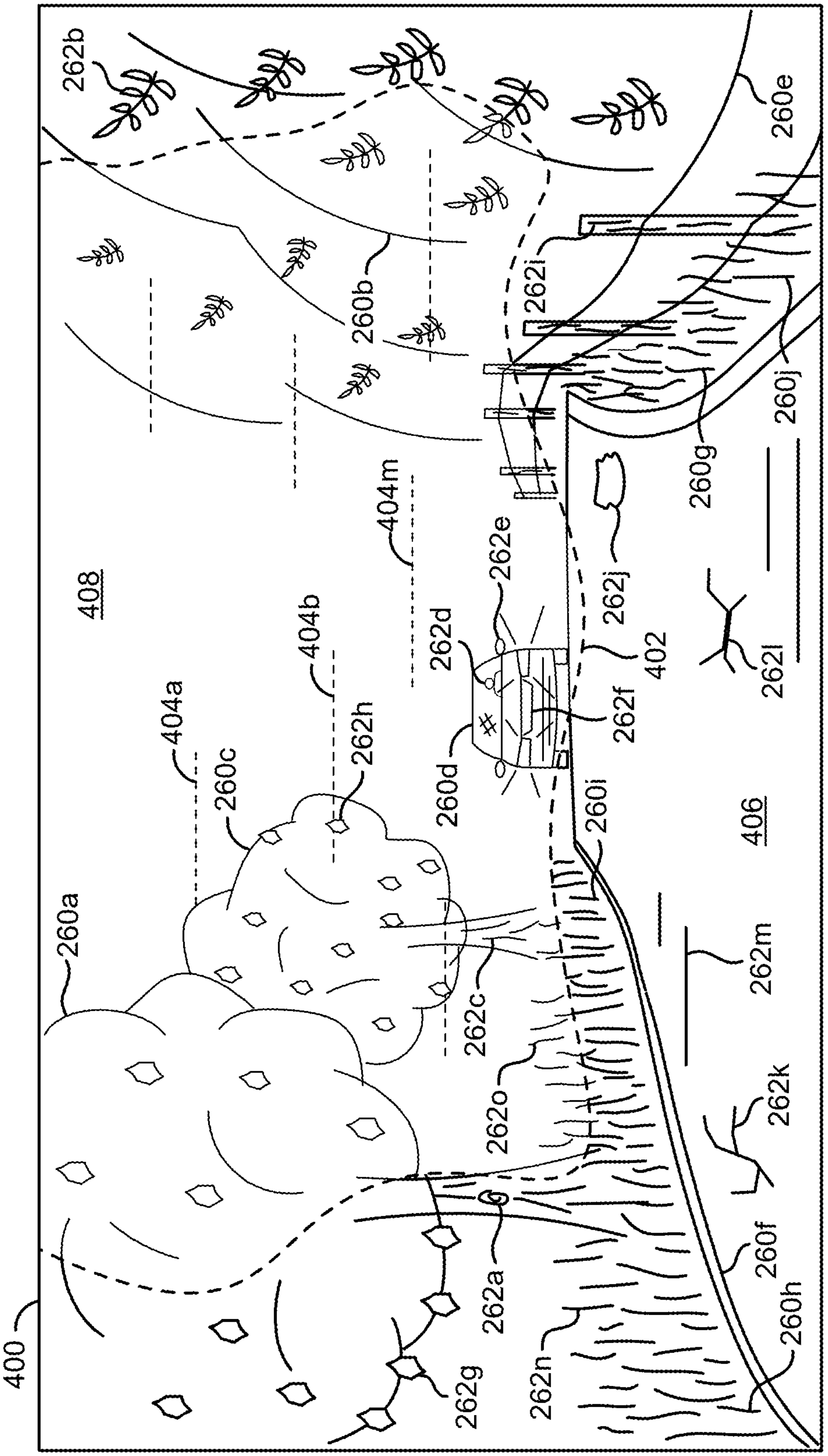
FIG. 10 is a diagram illustrating an example output defogged video frame.

Referring to FIG. 10, a diagram illustrating an example output defogged video frame is shown. An example video frame 400 is shown. The example video frame 400 may be one of the defogged output video frames in the signal FRM-DFG. For example, the example defogged output video frame 400 may be an output video frame after removing fog using the defogging intensity weights with adaptive smoothing. The example defogged output video frame 400 may be generated in response to the defogging operations by the video defogging module 200 in response to one of the input video frames 202_a_-202_n_. In the example shown, the defogged output video frame 400 may be generated from the foggy input video frame 250 shown in association with FIG. 5. For example, the defogged output video frame 400 may comprise a combination of the low frequency image content 260_a_-260_j_ that may have the defogging result removed and with the high frequency image content 262_a_-262_o_ restored.

The defogged output video frame 400 may comprise pixel data captured by the capture device 104 after the defogging operations have been performed by the video defogging module 200. In one example, the defogged output video frame 400 may be provided as an output of the processor 102 as the signal VIDOUT. In another example, defogged output video frame 400 may be used internally by the processor 102 for various other operations (e.g., computer vision operations, video-to-text AI operations, sensor fusion operations with radar data, etc.).

Generally, the defogged output video frame 400 may comprise similar video content as the foggy input video frame 250 (e.g., a video image of a vehicle driving on a roadway with trees and bushes on the side of the road). The defogged output video frame 400 may provide similar content as the foggy input video frame 250 but with greater visual clarity due to a reduction in fog. For example, a view and/or details of the environment captured in the foggy input video frame 250 that were partially obstructed by the foggy conditions may be shown with a higher amount of clarity in the defogged output video frame 400.

The defogged output video frame 400 may comprise a dashed line 402 forming an irregular shape. Dotted vertical lines 404_a_-404_m_ are shown within the irregular shape 402. The irregular shape 402 and the dotted vertical lines 404_a_-404_m_ may represent a reduced fog effect. For example, the irregular shape 402 may illustrate a reduced fog boundary and the dotted vertical lines 404_a_-404_m_ may represent a reduced visual obstruction caused by the fog. As a result of the defogging operations performed by the video defogging module 200, there may be less of the reduced fog obstruction 404_a_-404_m_ shown in the defogged output video frame 400 than the fog obstruction 254_a_-254_n_ shown in the foggy input video frame 250.

A video frame portion 406 is shown on one side of the reduced fog boundary 402. The video frame portion 406 may comprise an increased clear conditions region. The increased clear conditions region 406 may not be obstructed by the fog. For example, the increased clear conditions region 406 may be outside of the reduced fog effect. The various objects, view distance and/or visual details in the increased clear conditions region 406 may appear clear. Due to the reduction in fog resulting from the defogging operations, a greater portion of the defogged output video frame 400 may comprise the increased clear conditions region 406 than the portion of the foggy input video frame 250 that comprises the clear conditions region 256.

A video frame portion 408 is shown on one side of the reduced fog boundary 402 (e.g., opposite to the increased clear conditions region 406). The video frame portion 408 may comprise a reduced foggy conditions region. The reduced foggy conditions region 408 may have some degree of visual obstruction caused by fog (or other types of humidity). For example, the reduced foggy conditions region 408 may be within the fog effect. The various objects, view distance and/or visual details in the reduced foggy conditions region 408 may appear blurry, may be more difficult to see and/or may be more difficult to distinguish. Due to the reduction in fog resulting from the defogging operations, a lesser portion of the defogged output video frame 400 may comprise the reduced foggy conditions region 408 than the portion of the foggy input video frames 250 that comprises the foggy conditions region 258.

In the example shown, since the reduced foggy conditions region 408 is smaller in the defogged output video frame 400 than the foggy conditions region 258 in the foggy input video frame 250, more of the various objects and/or details may be visible without being visually obstructed by the fog. For example, in the defogged output video frame 400, the puddle (e.g., the high frequency image content 262*j* and the nearby vegetation (e.g., the low frequency image content 260*i*) may be in the increased clear conditions region 406 after the fog reduction instead of being in the foggy conditions region 258 as shown in the foggy input video frame 250.

Due to the adjustable defogging strength value, an intensity of the fog reduction may be adjustable. Generally, if the defogging strength is strong, some areas of the brightness and/or small details of the image may be reduced. To balance a potential loss of brightness and/or small details due to defogging and the strength of the fog removal, the defogged output video frame 400 may comprise some remaining fog. The reduced fog obstructions 404*a*-404*m* and the reduced foggy conditions region 408 may represent residual fog in the defogged output video frame 400. While there may be residual fog in the defogged output video frame 400, the effect on the visual quality and/or details of objects in the defogged output video frame 400 may be less than the effect of the fog in the foggy input video frame 250. For example, even though some of the objects/details may still be partially obscured by residual fog, the objects/details may be more visible after the fog reduction (e.g., even in the reduced foggy conditions region 408, the amount of visual obstruction and/or blur effect due to the fog may be less than in the foggy conditions region 258).

As an illustrative example, portions of the defogged output video frame 400 and/or objects located in the increased clear conditions region 406 may be drawn with thicker lines than the lines used to draw objects located in the reduced foggy conditions region 408. However, the thickness of the lines in the reduced foggy conditions region 408 may be illustrated as thicker than the thinnest lines used in the foggy conditions region 258 in the foggy input video frame 250. The difference in thickness in lines in the reduced foggy conditions region 408 and the foggy conditions region 258 may provide a visual indication that objects, characteristics and/or features may be blurred and/or difficult to interpret may be less blurry and/or difficult to interpret and/or view distances may not be as short in the reduced foggy conditions region 408 compared to the foggy conditions region 258 as a result of the fog removal operations. The amount and/or type of visual differences caused by the fog reduction may be varied according to the environmental conditions in the captured environment.

The defogged output video frame 400 may comprise a combination of low frequency image content and high frequency image content. The signal FRAME comprising the foggy input video frame 250, the signal DL comprising the high frequency detail layer 380 and the signal DEFOG comprising the amount of defogging for each position may be received by the summation module 218. For example, the high frequency detail layer 280 may be added to the foggy input video frame 250 and the amount of defogging for each position may be subtracted to generate the defogged output video frame 400. The amount of defogging for each position may be determined based on the defogging intensity weights with adaptive smoothing. The adaptive smoothing may ensure the defogged output video frame 400 provides the reduced foggy conditions region 408 with the reduced fog obstruction 404*a*-404*m* while maintaining gradual transitions in the luminance between adjacent regions in the defogged output video frame 400. For example, the fog reduction may be achieved without adding artifacts that may be visually distracting. The defogged output video frame 400 may be output as the signal FRM-DFG.

The defogged output video frame 400 may be generated to provide clarity for driver assistance features (e.g., removing fog may provide a better view for a backup camera, a rearview mirror cam, dashcam footage, a surround view of the vehicle, etc.). For example, the defogged output video frame 400 may provide a visual benefit when a person may be viewing the video output on a display. The defogged output video frame 400 may be further generated to provide more details for additional video processing operations such as computer vision operations. For example, the reduction of fog in the defogged output video frame 400 may enable accurate results and/or prevent indeterminate (e.g., low confidence) results when performing the computer vision operations and/or video-to-text AI operations. Using the defogged output video frame 400, various objects may be detected in response to animal detection, household object detection, interior object detection, person detection, vehicle detection, roadway detection, sky region detection, obstacle detection and/or exterior object detection (e.g., one or more of the neural network 190*b* and/or a video-to-text AI model may comprise libraries configured to detect people, vehicles, objects, animals, etc.). In some embodiments, the reduction in blur due to fog may aid in detecting debris that may accumulate on the lens 160.

The computer vision operations, debris analysis and/or sensor-fusion-to-text operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. In some embodiments, the behavior, movement direction and/or liveness of an object may be determined by analyzing a sequence of the defogged output video frames in the signal FRM-DFG captured over time. For example, a path of movement and/or speed of movement characteristic may be used to determine that an object classified as a person may be walking or running. The types of characteristics and/or behaviors detected may be varied according to the design criteria of a particular implementation.

The processor 102, the CNN module **190*b*, and/or the video-to-text AI model may be configured to implement region, animal, lens obstruction, object and/or face detection techniques. In some embodiments, other types of subjects as objects of interest may be detected (e.g., vehicles, passengers, pedestrians, street signs, etc.). The computer vision techniques and/or the video-to-text techniques may be configured to detect the regions of interest (ROIs) of the detected objects and/or generate the information about the detected objects and/or the context of the scene generally. The computer vision technique may be looped (e.g., to iteratively perform object/subject detection throughout the defogged video frames) in order to determine if any objects of interest (e.g., as defined by the feature set) are within the field of view of the lens 160 and/or the image sensor 180**.

The computer vision operations and/or the video-to-text operations performed by the processor 102, the CNN module **190*b*** and/or the video-to-text AI model may be configured to detect background objects and/or other types of objects. The background objects may be detected for other computer vision purposes (e.g., training data, labeling, depth detection, etc.). The type(s) of subjects identified as the objects of interest may be varied according to the design criteria of a particular implementation. Details of computer vision, video-to-text operations and/or sensor-fusion-to-text operations may be described in association with U.S. patent application Ser. No. 18/583,298, filed on Feb. 11, 2024, U.S. patent application Ser. No. 18/621,504, filed on Mar. 29, 2024, U.S. patent application Ser. No. 18/657,588, filed on May 7, 2024 and/or U.S. patent application Ser. No. 18/657,492, filed on May 7, 2024, appropriate portions of which are incorporated by reference.

Figure 11:
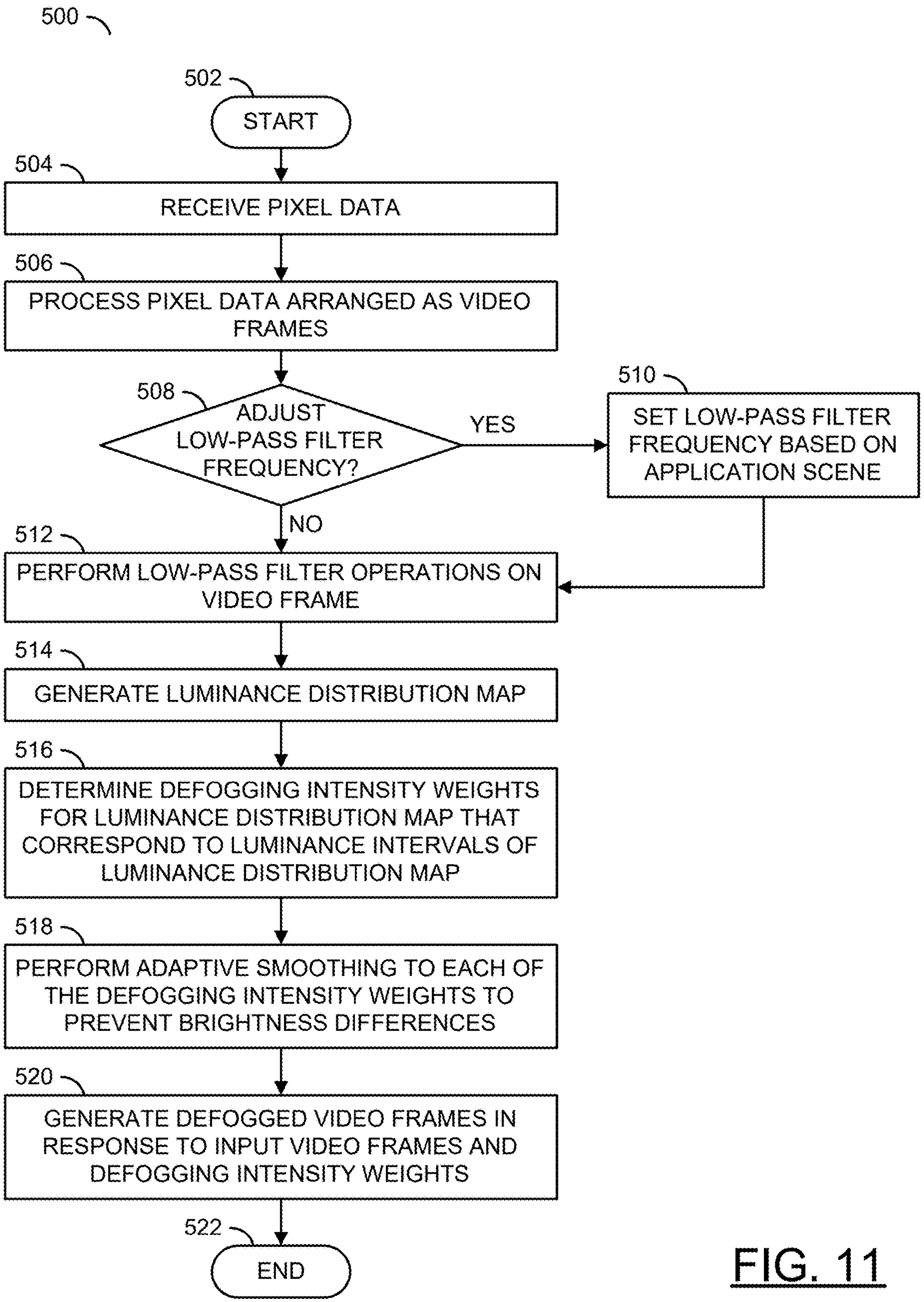
FIG. 11 is a flow diagram illustrating a method for providing high performance and low complexity adaptive video image defogging.

Referring to FIG. 11, a method (or process) 500 is shown. The method 500 may provide high performance and low complexity adaptive video image defogging. The method 500 generally comprises a step (or state) 502, a step (or state) 504, a step (or state) 506, a decision step (or state) 508, a step (or state) 510, a step (or state) 512, a step (or state) 514, a step (or state) 516, a step (or state) 518, a step (or state) 520, and a step (or state) 522.

The step 502 may start the method 500. In the step 504, the processor 102 may receive pixel data. For example, the image sensor 180 may generate the signal VIDEO comprising pixel data in response to the light input LIN captured by the capture device 104. Next, in the step 506, the processor 102 may process the pixel data arranged as video frames. For example, the processor 102 may perform various operations on the pixel data arranged as video frames (e.g., perform computer vision operations, calculate depth data, determine white balance, etc.). The video defogging module 200 may receive the video frames **202*a*-202*n* (e.g., as shown in association with FIG. 5). Next, the method 500 may move to the decision step 508**.

In the decision step 508, the processor 102 may determine whether to adjust the cut-off frequency of the low pass filter 204. For example, the video defogging module 200 may adjust the cut-off frequency based on the resolution and/or frame rate of the video frames **202*a*-202*n*. If the cut-off frequency is determined to be adjusted, then the method 500 may move to the step 510. In the step 510, the cut-off frequency for the low pass filter 204 may be set based on the application scene. Next, the method 500 may move to the step 512. In the decision step 508, if the cut-off frequency does not need to be adjusted, then the method 500 may move to the step 512. In the step 512, the low pass filter 204 may perform low pass filter operations on a current one of the video frames 202*a*-202*n* to generate the low frequency layer. Next, the method 500 may move to the step 514**.

In the step 514, the luminance interval control module 206 may generate the luminance distribution map 208. The luminance distribution map 208 may be generated in response to the low frequency layer 300. Next, in the step 516, the smoothing control module 210 may determine the defogging intensity weights for the luminance distribution map 208. The defogging intensity weights may correspond to the luminance intervals of the luminance distribution map 208. For example, the luminance interval control module 206 may set the number of N intervals for the luminance distribution map 208. In the step 518, the smoothing control module 210 may perform adaptive smoothing to each of the defogging intensity weights to prevent brightness difference between regions of the current one of the video frames **202*a*-202*n*. Next, in the step 520, the video defogging module 200 may generate the defogged video frames in response to the input video frames 202*a*-202*n* and the smoothed defogging intensity weights (e.g., the signal SMTH-DFG). For example, the defogged video frames may be presented in the signal FRM-DFG. Next, the method 500 may move to the step 522. The step 522 may end the method 500**.

Figure 12:
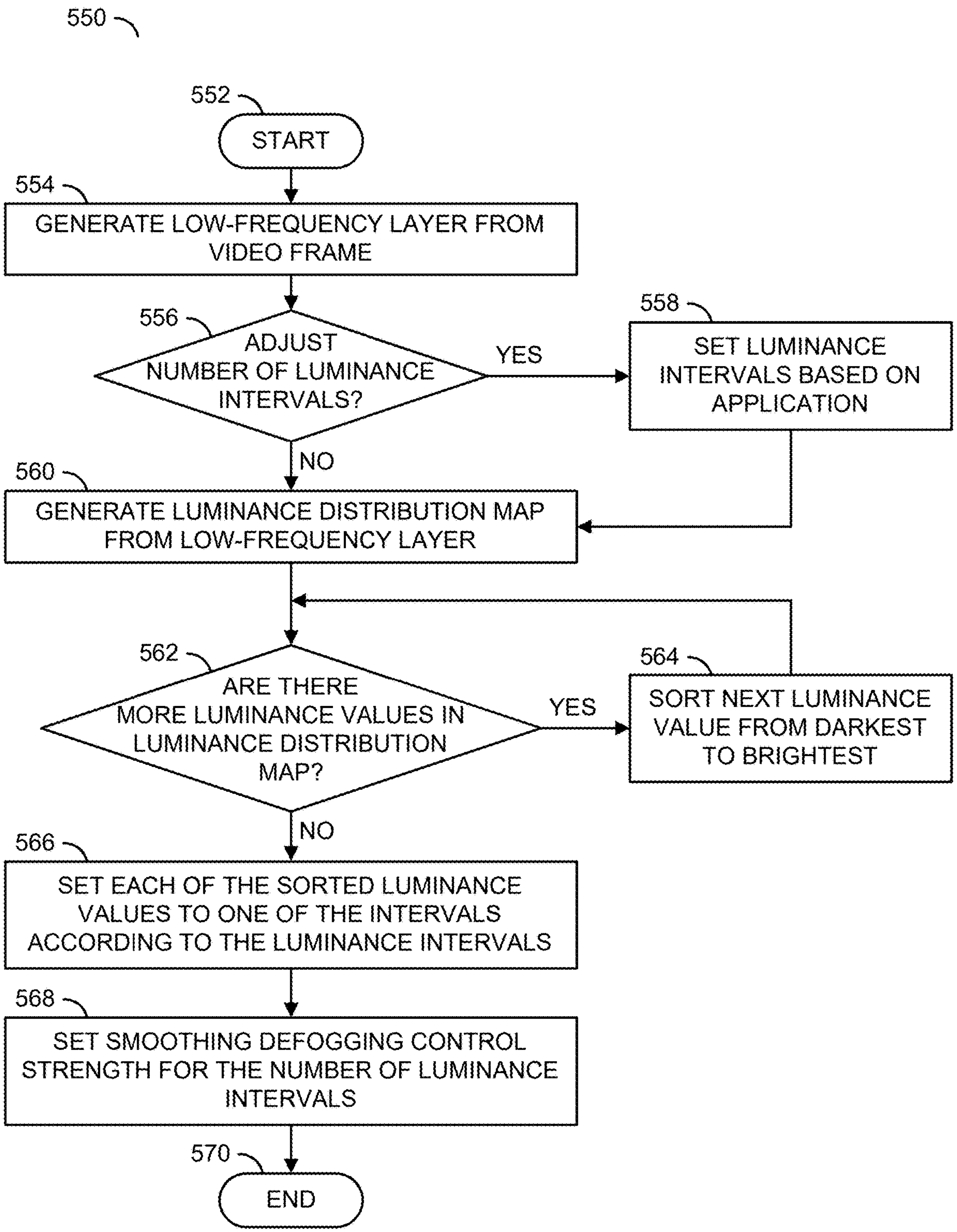
FIG. 12 is a flow diagram illustrating a method for determining smoothing control strength values for luminance intervals.

Referring to FIG. 12, a method (or process) 550 is shown. The method 550 may determine smoothing control strength values for luminance intervals. The method 550 generally comprises a step (or state) 552, a step (or state) 554, a decision step (or state) 556, a step (or state) 558, a step (or state) 560, a decision step (or state) 562, a step (or state) 564, a step (or state) 566, a step (or state) 568, and a step (or state) 570.

The step 522 may start the method 550. In the step 524, the low pass filter 204 may generate the low-frequency layer 300 from a current one of the video frames **202*a*-202*n* (e.g., the foggy input video frame 250). Next, the method 550 may move to the decision step 556. In the decision step 556, the luminance interval control module 206 may determine whether to adjust the number of luminance intervals. For example, the number of luminance intervals may be determined based on the luminance interval value and/or the range of luminance values. If the luminance intervals are determined to be adjusted, then the method 550 may move to the step 558. In the step 558, the luminance interval control module 206 may set the luminance intervals based on the application and/or the scene in the video frames 202*a*-202*n*. Next, the method 550 may move to the step 560. In the decision step 556, if the number of luminance intervals is not adjusted, then the method 550 may move to the step 560. In the step 560, the luminance interval control module 206 may generate the luminance distribution map 208 from the low frequency layer 300. Next, the method 550 may move to the decision step 562**.

In the decision step 562, the smoothing control module 210 may determine whether there are more of the luminance values L00-Lmn in the luminance distribution map 208. If there are more of the luminance values L00-Lmn, then the method 550 may move to the step 564. In the step 564, the smoothing control module 210 may sort the next one of the luminance values L00-Lmn from darkest to brightest. Next, the method 550 may return to the decision step 562. In the decision step 562, if there are no more of the luminance values L00-Lmn, then the method 550 may move to the step 566. In the step 566, the smoothing control module 210 may set each of the sorted luminance values L00-Lmn to one of the intervals according to the luminance intervals. Next, in the step 568, the smoothing control module 210 may set the smoothing defogging control strength for the number of luminance intervals. The smoothing defogging control strength may be determined based on the signal DFG-WGT. Next, the method 550 may move to the step 570. The step 570 may end the method 550.

Figure 13:
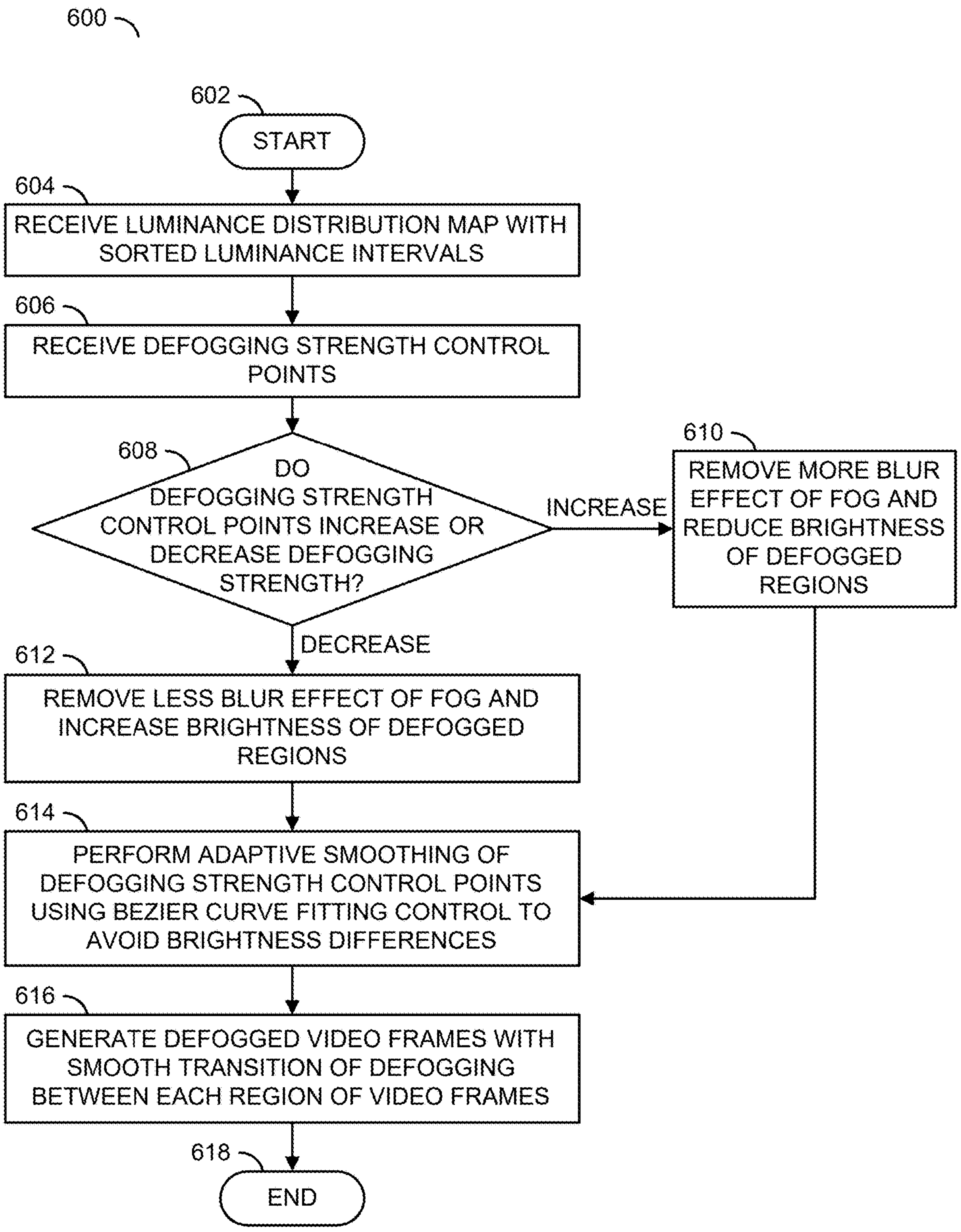
FIG. 13 is a flow diagram illustrating a method for setting a defogging strength.

Referring to FIG. 13, a method (or process) 600 is shown. The method 600 may set a defogging strength. The method 600 generally comprises a step (or state) 602, a step (or state) 604, a step (or state) 606, a decision step (or state) 608, a step (or state) 610, a step (or state) 612, a step (or state) 614, a step (or state) 616, and a step (or state) 618.

The step 602 may start the method 600. In the step 604, the smoothing control module 210 may receive the luminance distribution map 208 with the sorted luminance intervals. In some embodiments, the luminance interval control module 206 may perform the sorting of the intervals of the luminance distribution map 208 from darkest to brightest. Next, in the step 606, the smoothing control module 210 may receive the defogging strength control points. The defogging strength control points may be provided by the signal DFG-WGT. In an example, the signal DFG-WGT may be an input parameter for the video defogging module 200. Next, the method 600 may move to the decision step 608.

In the decision step 608, the smoothing control module 210 may determine whether the defogging strength control points provide an increase or decrease in defogging strength. If the defogging strength control points provide an increase in defogging strength, then the method 600 may move to the step 610. In the step 610, the defogging may be determined to remove more of the blur effect caused by the fog and reduce the brightness of the defogged regions. Next, the method 600 may move to the step 614. In the decision step 608, if the defogging strength control points provide a decrease in defogging strength, then the method 600 may move to the step 612. In the step 612, the defogging may be determined to remove less of the blur effect caused by the fog and increase brightness in the defogged regions. Next, the method 600 may move to the step 614.

In the step 614, the smoothing control module 210 may perform the adaptive smoothing of the defogging strength control points using a Bezier curve fitting control in order to avoid brightness differences in the regions 306*aa*-306*mn*. Next, in the step 616, the video defogging module 200 may generate the defogged video frames in the signal FRM-DFG with a smooth transition of defogging between each of the regions of the output video frames. Next, the method 600 may move to the step 618. The step 618 may end the method 600.

Figure 14:
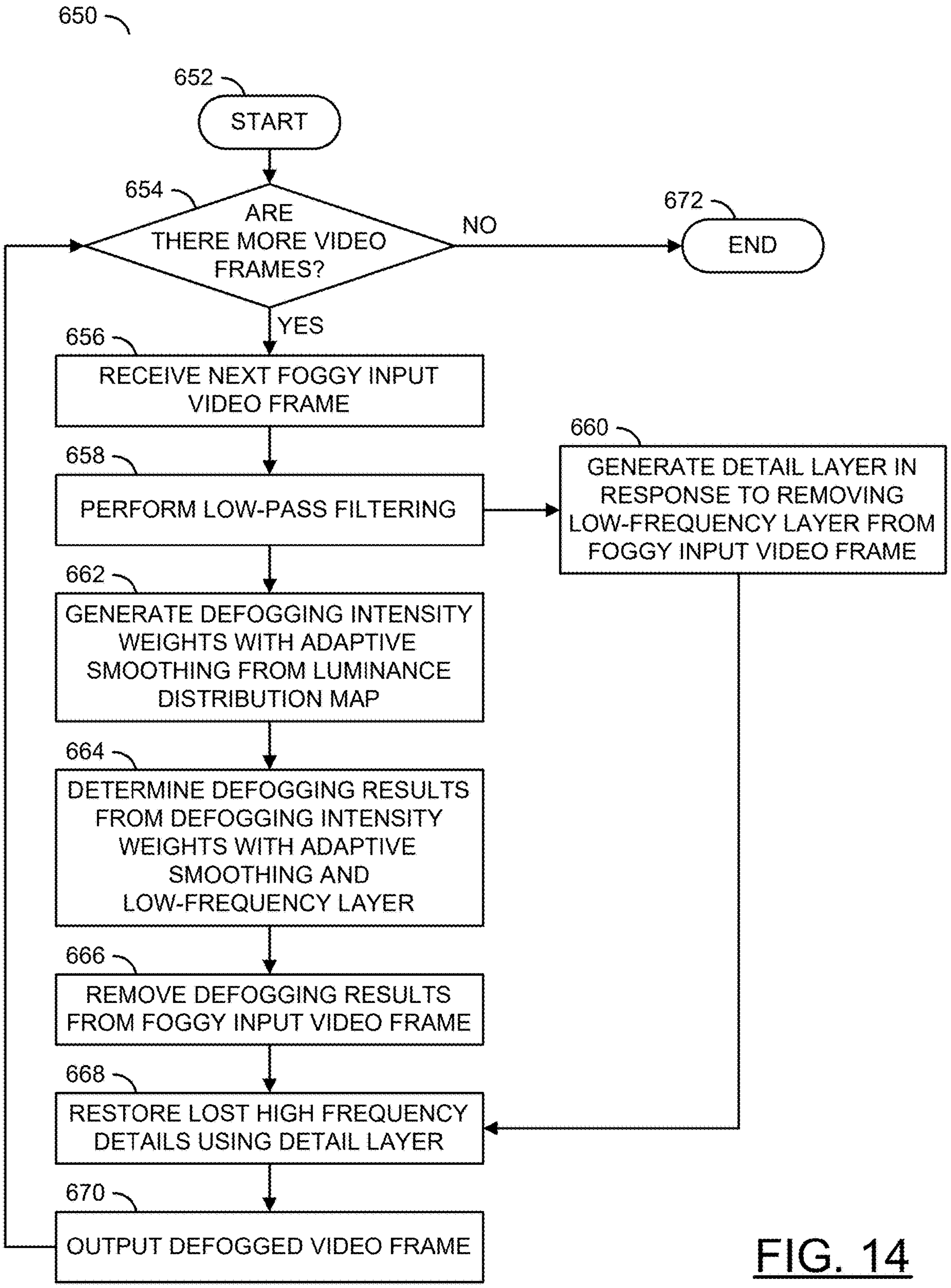
FIG. 14 is a flow diagram illustrating a method for generating defogged video frames.

Referring to FIG. 14, a method (or process) 650 is shown. The method 650 may generate defogged video frames. The method 650 generally comprises a step (or state) 652, a decision step (or state) 654, a step (or state) 656, a step (or state) 658, a step (or state) 660, a step (or state) 662, a step (or state) 664, a step (or state) 666, a step (or state) 668, a step (or state) 670, and a step (or state) 672.

The step 652 may start the method 650. Next, in the decision step 654, the video defogging module 200 may determine whether there are any more of the video frames 202*a*-202*n*. The video frames 202*a*-202*n* may be provided by the signal FRAMES. If there are more of the video frames 202*a*-202*n*, then the method 650 may move to the step 656. In the step 656, the video defogging module 200 may receive a next one of the input video frames 202*a*-202*n*. In the step 658, the low pass filter 204 may perform a low pass filtering of the current one of the video frames 202*a*-202*n* to generate the low frequency layer 300. Next, the method 650 may move to the step 660 and the step 662. For example, steps 662-666 and the step 660 may be performed in parallel and/or substantially in parallel.

In the step 660, the detail layer 216 may be generated. The detail layer 216 may be generated in response to removing the low frequency layer 300 from the current one of the video frames 202*a*-202*n* (e.g., the foggy input video frame 250). The summing module 214 may perform the subtraction operation to remove the low frequency layer 300 from the video frames 202*a*-202*n*. Next, the method 650 may move to the step 668.

In the step 662, the smoothing control module 210 may generate the defogging intensity weights with adaptive smoothing from the luminance distribution map 208. For example, the luminance interval control module 206 may generate the luminance distribution map 208, and the smoothing control module 210 may generate the adaptively smoothed defogging intensity weights based on the luminance intervals. Next, in the step 664, the video defogging module 200 may determine the defogging results (e.g., the signal DEFOG) from the defogging intensity weights with the adaptive smoothing and the low frequency layer 300. For example, the multiplication module 212 may perform a multiplication operation between the adaptively smoothing defogging weights in the signal SMTH-DFG and the low frequency layer in the signal LFL. Next, the method 650 may move to the step 666.

In the step 666, the summation module 218 may remove the defogging results from the current one of the video frames 202*a*-202*n* (e.g., the foggy input video frame 250). For example, the defogging results may be provided in the signal DEFOG. The summation module 218 may be configured to subtract the defogging results from the foggy input video frames. Next, in the step 668, the summation module 218 may restore the lost high frequency details using the detail layer 216. For example, removing the defogging results may cause some high detail loss from the video frames 202*a*-202*n*. The summation module 218 may be configured to perform an addition operation between the current one of the video frames 202*a*-202*n* that has the defogging results removed and detail layer 216. In the step 670, the video defogging module 200 may output the defogged video frame based on the current one of the video frames 202*a*-202*n*. Next, the method 650 may return to the decision step 654. In the decision step 654, if there are more of the foggy input video frames, the method 650 may repeat the steps 656-670. If there are no more of the video frames 202*a*-202*n*, then the method 650 may move to the step 672. The step 672 may end the method 650.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms “may” and “generally” when used herein in conjunction with “is(are)” and verbs are meant to communicate the intention that the description is exemplary and believed to be broad enough to encompass both the specific examples presented in the disclosure as well as alternative examples that could be derived based on the disclosure. The terms “may” and “generally” as used herein should not be construed to necessarily imply the desirability or possibility of omitting a corresponding element.

The designations of various components, modules and/or circuits as “a” “n”, when used herein, disclose either a singular component, module and/or circuit or a plurality of such components, modules and/or circuits, with the “n” designation applied to mean any particular integer number. Different components, modules and/or circuits that each have instances (or occurrences) with designations of “a” “n” may indicate that the different components, modules and/or circuits may have a matching number of instances or a different number of instances. The instance designated “a” may represent a first of a plurality of instances and the instance “n” may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive pixel data of an environment; and a processor configured to (i) process said pixel data arranged as video frames, (ii) generate a luminance distribution map of said video frames in response to a low-pass filter operation, (iii) determine a plurality of defogging intensity weights for said luminance distribution map, (iv) perform adaptive smoothing to each of said plurality of defogging intensity weights, and (v) generate defogged video frames in response to (a) said video frames and (b) said plurality of defogging intensity weights with said adaptive smoothing, wherein (a) said plurality of defogging intensity weights each correspond to one of a plurality of luminance intervals of said luminance distribution map, and (b) said adaptive smoothing is configured to prevent brightness differences in said defogged video frames.

2. The apparatus according to claim 1, wherein said adaptive smoothing comprises a Bezier curve fitting control.

3. The apparatus according to claim 2, wherein an order of said Bezier curve fitting control is selected to provide a trade-off between eliminating said brightness differences and a complexity of operations for performing said Bezier curve fitting control.

4. The apparatus according to claim 1, wherein said processor is configured to determine said plurality of defogging intensity weights in response to (i) dividing said luminance distribution map into a plurality of regions (ii) extracting a respective luminance value from each of said plurality of regions, and (iii) sorting each of said respective luminance values from darkest to brightest to determine said plurality of luminance intervals.

5. The apparatus according to claim 4, wherein said brightness differences are prevented in response to creating a smooth transition of defogging between each of said plurality of regions.

6. The apparatus according to claim 5, wherein said brightness differences are prevented to avoid a local region with high contrast.

7. The apparatus according to claim 4, wherein said adaptive smoothing is configured to respond to a non-uniformity of fog in said video frames based on (i) an image position of said plurality of regions and (ii) a luminance distribution.

8. The apparatus according to claim 4, wherein (i) said plurality of regions of said luminance distribution map comprise rectangular regions of said video frames and (ii) said luminance value is determined for each of said rectangular regions.

9. The apparatus according to claim 4, wherein a number of said plurality of luminance intervals is determined in response to a range of each of said respective luminance values from each of said plurality of regions and divided by a luminance interval value.

10. The apparatus according to claim 4, wherein a size of each of said plurality of regions is a 16×16 rectangle of pixels of said video frames.

11. The apparatus according to claim 1, wherein determining said plurality of defogging intensity weights and performing said adaptive smoothing enables controlling a defogging intensity according to real-time changes of fog conditions.

12. The apparatus according to claim 11, wherein said plurality of defogging intensity weights are configured to control an amount of said defogging intensity.

13. The apparatus according to claim 11, wherein an amount of said defogging intensity is adjustable based on values selected for said defogging intensity weights.

14. The apparatus according to claim 13, wherein (i) adjusting said amount of said defogging intensity determines an amount of fog remaining in said defogged video frames and (ii) increasing said amount of said defogging intensity reduces brightness in said defogged video frames.

15. The apparatus according to claim 14, wherein reducing said brightness causes a contrast reduction of details in dark regions of said defogged video frames.

16. The apparatus according to claim 1, wherein said plurality of defogging intensity weights are configured to remove an image blur effect caused by fog captured in said video frames.

17. The apparatus according to claim 1, wherein said defogged video frames are generated in response to a high performance and low complexity image defogging technique based on image position and luminance distribution.

18. The apparatus according to claim 1, wherein (i) said low-pass filter operation is configured to separate a high frequency layer from each of said video frames, (ii) image processing is performed using said plurality of defogging intensity weights to generate a defogging result, and (iii) said high frequency layer is added to said defogging result to generate said defogged video frames.

19. The apparatus according to claim 18, wherein (i) said image processing comprises multiplying said plurality of defogging intensity weights that have said adaptive smoothing with a low frequency layer generated by said low-pass filter operation to generate said defogging result, (ii) subtracting said defogging result from said video frames results in a loss of detail and (iii) adding said high frequency layer restores said loss of detail.

20. The apparatus according to claim 1, wherein (i) a cut-off frequency for said low-pass filter operation, (ii) a strength of said plurality of defogging intensity weights, and (iii) a number of said plurality of luminance intervals are each adjustable parameters for generating said defogged video frames.

* * * * *